United States Patent
Minder et al.

(10) Patent No.: US 8,935,425 B2
(45) Date of Patent: Jan. 13, 2015

(54) SWITCHING BETWEEN REPRESENTATIONS DURING NETWORK STREAMING OF CODED MULTIMEDIA DATA

(71) Applicant: QUALCOMM Incorporated, San Diego, CA (US)

(72) Inventors: Lorenz Christoph Minder, Palo Alto, CA (US); Michael George Luby, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 13/644,373

(22) Filed: Oct. 4, 2012

(65) Prior Publication Data

US 2013/0091297 A1   Apr. 11, 2013

Related U.S. Application Data

(60) Provisional application No. 61/543,732, filed on Oct. 5, 2011.

(51) Int. Cl.
*G06F 15/16* (2006.01)
*H04L 29/06* (2006.01)
(Continued)

(52) U.S. Cl.
CPC ...... *H04L 65/4084* (2013.01); *H04N 21/23439* (2013.01); *H04N 21/4384* (2013.01); *H04L 65/80* (2013.01); *H04N 21/8456* (2013.01); *H04L 65/1089* (2013.01)
USPC .............................. 709/231; 715/201; 725/86

(58) Field of Classification Search
CPC .................. H04N 21/4384; H04L 65/1089

USPC .......... 709/200–203, 217–231; 715/201, 202, 715/203, 723; 725/86, 87, 91
See application file for complete search history.

(56) References Cited

U.S. PATENT DOCUMENTS

| 7,793,329 B2 | 9/2010 | Joshi et al. |
| 7,885,340 B2 | 2/2011 | Greenbaum et al. |

(Continued)

FOREIGN PATENT DOCUMENTS

| WO | 2006057938 A2 | 6/2006 |
| WO | 2010008416 A1 | 1/2010 |
| WO | 2011022432 A1 | 2/2011 |

OTHER PUBLICATIONS

International Preliminary Report on Patentability—PCT/US2012/058913, The International Bureau of WIPO—Geneva, Switzerland, Sep. 17, 2013, 7pp.

(Continued)

*Primary Examiner* — Moustafa M Meky
(74) *Attorney, Agent, or Firm* — Shumaker & Sieffert, P.A.

(57) ABSTRACT

Aspects of this disclosure generally relate to a method of retrieving video data of multimedia content. In an example, the method includes determining a first interval between switch points for a first representation of the multimedia content and a second interval between switch points for a second representation of the multimedia content, wherein the first interval is less than the second interval. The method also includes, based on the determination, submitting one or more network requests for an amount of video data from the first representation that has a playback time that is at least equal to a playback time between switch points in the second representation. The method also includes, after submitting the request for the amount of video data from the first representation, retrieving video data from the second representation.

52 Claims, 10 Drawing Sheets

(51) Int. Cl.
*H04N 21/2343* (2011.01)
*H04N 21/438* (2011.01)
*H04N 21/845* (2011.01)

(56) References Cited

U.S. PATENT DOCUMENTS

| | | | |
|---|---|---|---|
| 8,689,267 B2 * | 4/2014 | Hunt | 725/86 |
| 2008/0046939 A1 * | 2/2008 | Lu et al. | 725/90 |
| 2009/0180385 A1 | 7/2009 | Chen et al. | |
| 2009/0198827 A1 | 8/2009 | Hughes | |
| 2009/0310669 A1 | 12/2009 | Konoshima | |
| 2010/0138876 A1 | 6/2010 | Sullivan et al. | |
| 2010/0322302 A1 | 12/2010 | Rodriguez et al. | |
| 2011/0032832 A1 | 2/2011 | Jalali et al. | |
| 2011/0268178 A1 * | 11/2011 | Park et al. | 375/240.02 |
| 2012/0259994 A1 * | 10/2012 | Gillies et al. | 709/231 |

OTHER PUBLICATIONS

International Search Report and Written Opinion—PCT/US2012/058913—ISA/EPO—Feb. 27, 2013, 12 pp.

3rd Generation Partnership Project, "Progressive Download and Dynamic Adaptive Streaming over HTTP (3GP-DASH)," ETSI TS 126 247 v10.0.0, Jun. 2011, 96 pp.

Fielding et al., "Hypertext Transfer Protocol—HTTP/1.1" Network Working Group, Standards Track, Jun. 1999, 122 pp.

International Standardization Organization, "Information technology—MPEG systems technologies—Part 6: Dynamic adaptive streaming over HTTP (DASH)," ISO/IEC FCD 23001-06, Jan. 28, 2011, 86 pp.

Rezaei et al., "Tune-in Time Reduction in Video Streaming Over DVB-H," IEEE Transactions on Broadcasting, vol. 53, No. 1, Mar. 2007, 9 pp.

* cited by examiner

SWITCHING BETWEEN REPRESENTATIONS DURING NETWORK STREAMING OF CODED MULTIMEDIA DATA

This application claims the benefit of U.S. Provisional Application No. 61/543,732, filed 5 Oct. 2011, the entire contents of which is incorporated by reference.

TECHNICAL FIELD

This disclosure relates to network streaming of encoded multimedia data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as ITU-T H.264/AVC. Such packetized video data may be transported in a variety of ways, such as transmission over a computer network using network streaming.

SUMMARY

In general, this disclosure describes techniques for improving streaming of media data over a network. For example, the techniques of this disclosure are generally directed to improving a user's experience when initially retrieving multimedia content and when performing bandwidth adaptation. Aspects of this disclosure relate to providing information from a server device to a client device that indicates distances between switch points of various representations of the multimedia content. The client device may use this information to initially select a representation having relatively frequent switch points (albeit relatively lower perceived quality), buffer data of the representation, then switch to a representation having relatively higher perceived quality at a future switch point of the higher-quality representation.

In an example, a method of retrieving video data of multimedia content includes determining a first interval between switch points for a first representation of the multimedia content and a second interval between switch points for a second representation of the multimedia content, wherein the first interval is less than the second interval, based on the determination, submitting one or more network requests for an amount of video data from the first representation that has a playback time that is at least equal to a playback time between switch points in the second representation, and after submitting the request for the amount of video data from the first representation, retrieving video data from the second representation.

In another example, an apparatus for retrieving video data of multimedia content includes one or more processors configured to determine a first interval between switch points for a first representation of the multimedia content and a second interval between switch points for a second representation of the multimedia content, wherein the first interval is less than the second interval, based on the determination, submit one or more network requests for an amount of video data from the first representation that has a playback time that is at least equal to a playback time between switch points in the second representation, and after submitting the request for the amount of video data from the first representation, retrieve video data from the second representation.

In another example, an apparatus for retrieving video data of multimedia content includes means for determining a first interval between switch points for a first representation of the multimedia content and a second interval between switch points for a second representation of the multimedia content, wherein the first interval is less than the second interval, based on the determination, means for submitting one or more network requests for an amount of video data from the first representation that has a playback time that is at least equal to a playback time between switch points in the second representation, and after submitting the request for the amount of video data from the first representation, means for retrieving video data from the second representation.

In another example, aspects of this disclosure are directed to a non-transitory computer-readable storage medium storing instructions that, when executed, cause one or more processors to determine a first interval between switch points for a first representation of the multimedia content and a second interval between switch points for a second representation of the multimedia content, wherein the first interval is less than the second interval, based on the determination, submit one or more network requests for an amount of video data from the first representation that has a playback time that is at least equal to a playback time between switch points in the second representation, and after submitting the request for the amount of video data from the first representation, retrieve video data from the second representation.

In another example, a method of streaming video data of multimedia content includes receiving a plurality of representations of the multimedia content, wherein the representations include switch point interval information representative of intervals between switch points for the respective representations, sending video data of a first one of the representations to a client device in response to a request from the client device, and after sending an amount of video data from the first representation that has a playback time that is at least equal to a playback time between switch points in a second, different one of the representations, sending video data of the second one of the representations to the client device, wherein the interval between switch points for the second one of the representations is lower than the interval between switch points for the first one of the representations.

In another example, an apparatus for streaming video data of multimedia content includes one or more processors configured to receive a plurality of representations of the multimedia content, wherein the representations include switch point interval information representative of intervals between switch points for the respective representations, send video data of a first one of the representations to a client device in response to a request from the client device, and after sending an amount of video data from the first representation that has a playback time that is at least equal to a playback time between switch points in a second, different one of the representations, send video data of the second one of the representations to the client device, wherein the interval between switch points for the second one of the representations is lower than the interval between switch points for the first one of the representations.

In another example, an apparatus for streaming video data of multimedia content includes means for receiving a plurality of representations of the multimedia content, wherein the representations include switch point interval information representative of intervals between switch points for the respective representations, means for sending video data of a first one of the representations to a client device in response to a request from the client device, and after sending an amount of video data from the first representation that has a playback time that is at least equal to a playback time between switch points in a second, different one of the representations, means for sending video data of the second one of the representations to the client device, wherein the interval between switch points for the second one of the representations is lower than the interval between switch points for the first one of the representations.

In another example, aspects of this disclosure are directed to a non-transitory computer-readable storage medium storing instructions that, when executed, cause one or more processors to receive a plurality of representations of the multimedia content, wherein the representations include switch point interval information representative of intervals between switch points for the respective representations, send video data of a first one of the representations to a client device in response to a request from the client device, and after sending an amount of video data from the first representation that has a playback time that is at least equal to a playback time between switch points in a second, different one of the representations, send video data of the second one of the representations to the client device, wherein the interval between switch points for the second one of the representations is lower than the interval between switch points for the first one of the representations.

The details of one or more examples are set forth in the accompanying drawings and the description below. Other features, objects, and advantages will be apparent from the description and drawings, and from the claims.

DETAILED DESCRIPTION

Figure 1:
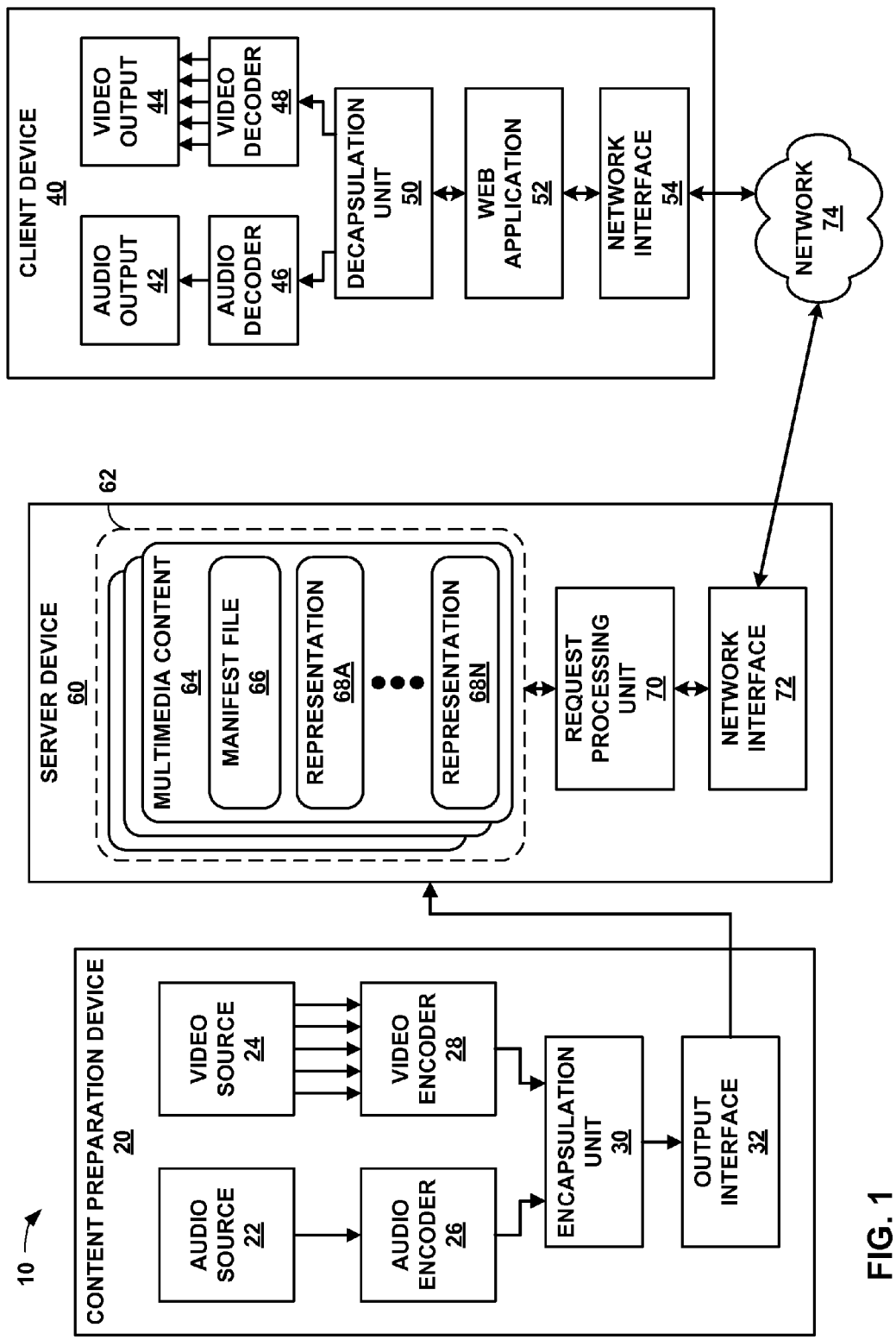
FIG. 1 is a block diagram illustrating an example system that implements techniques for streaming media data over a network.

In general, this disclosure describes techniques for streaming multimedia data, such as audio and video data, over a network. The techniques of this disclosure may be used in conjunction with dynamic adaptive streaming over HTTP (DASH). This disclosure describes various techniques that may be performed in conjunction with network streaming, any or all of which may be implemented alone or in any combination. As described in greater detail below, various devices performing network streaming may be configured to implement the techniques of this disclosure.

In accordance with DASH and similar techniques for streaming data over a network, multimedia content (such as a movie or other audio/video content, which may also include text overlays or other data) may be encoded in a variety of ways and with a variety of characteristics. A content preparation device may form multiple representations of the same multimedia content. Each representation may correspond to a particular set of characteristics, such as coding and rendering characteristics, to provide data usable by a variety of different client devices with various coding and rendering capabilities. Moreover, representations having various bit rates may allow for bandwidth adaptation. That is, a client device may determine an amount of bandwidth that is currently available and select a representation based on the amount of available bandwidth, along with coding and rendering capabilities of the client device.

In some examples, a content preparation device may indicate that a set of representations has a set of common characteristics. The content preparation device may then indicate that the representations in the set form an adaptation set, in that representations in the set can be used for bandwidth adaptation. In some instances, an adaptation set may also be referred to as a "representation group." That is, representations in the set may differ in bit rate, but otherwise share substantially the same characteristics. In this manner, a client device may determine various sets of common characteristics for adaptation sets of multimedia content, and select an adaptation set based on coding and rendering capabilities of the client device. Then, the client device may adaptively switch between representations in the selected adaptation set based on bandwidth availability.

The content preparation device may also provide separate network locations for different portions of a manifest file, such as a media presentation description (MPD) file in a format prescribed by 3GPP (Third Generation Partnership Project). That is, different portions of the manifest file may be independently addressable by, e.g., various uniform resource identifiers (URIs), such as uniform resource locators (URLs). An initial portion of the manifest file may include a URI, URL, or other location identifier of another portion of the manifest file. For example, a first portion of the manifest file may include descriptions of common characteristics of adaptation sets, as discussed above.

Each of the adaptation sets may be associated with a respective different portion of the manifest file, which may include data indicative of locations of media data of representations in the respective adaptation set. In this manner, a client device may receive the first portion of the manifest file, select an appropriate adaptation set, retrieve another portion of the manifest file for the selected adaptation set, select a representation of the selected group, and use the other portion of the manifest file to retrieve data of the selected representation. Moreover, the client device may adapt to changing network bandwidth using the other portion of the manifest file, that is, the portion specific to the selected adaptation set.

Video files, such as segments of representations of media content, may conform to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. The ISO Base Media File format is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audiovisual presentations. The file structure may be object-oriented. A file can be decomposed into basic objects very simply and the structure of the objects is implied from their type.

Files conforming to the ISO base media file format (and extensions thereof) may be formed as a series of objects, called "boxes." Data in the ISO base media file format may be contained in boxes, such that no other data needs to be contained within the file and there need not be data outside of boxes within the file. This includes any initial signature required by the specific file format. A "box" may be an object-oriented building block defined by a unique type identifier and length. Typically, a presentation is contained in one file, and the media presentation is self-contained. The movie container (movie box) may contain the metadata of the media and the video and audio frames may be contained in the media data container and could be in other files.

A representation (motion sequence) may be contained in several files, sometimes referred to as segments. Timing and framing (position and size) information is generally in the ISO base media file and the ancillary files may essentially use any format. This presentation may be 'local' to the system containing the presentation, or may be provided via a network or other stream delivery mechanism.

An optional metadata track can be used to tag each track with the "interesting characteristic" that it has, for which its value may differ from other members of the group (e.g., its bit rate, screen size, or language). Some samples within a track may have special characteristics or may be individually identified. One example of the characteristic is the synchronization point (often a video I-frame). These points may be identified by a special table in each track. More generally, the nature of dependencies between track samples can also be documented using metadata. The metadata can be structured as a sequence of file format samples, just like a video track. Such a track may be referred to as a metadata track. Each metadata sample may be structured as a metadata statement. There are various kinds of statements, corresponding to the various questions that might be asked about the corresponding file-format sample or its constituent samples.

When media is delivered over a streaming protocol, the media may need to be transformed from the way it is represented in the file. One example of this is when media is transmitted over the Real-time Transport Protocol (RTP). In the file, for example, each frame of video is stored contiguously as a file-format sample. In RTP, packetization rules specific to the codec used must be obeyed to place these frames in RTP packets. A streaming server may be configured to calculate such packetization at run-time. However, there is support for the assistance of the streaming servers.

The techniques of this disclosure may be applicable to network streaming protocols, such as HTTP streaming, e.g., in accordance with dynamic adaptive streaming over HTTP (DASH). In HTTP streaming, frequently used operations include GET and partial GET. The GET operation retrieves a whole file associated a given uniform resource locator (URL) or other identifier, e.g., URI. The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. Note that, in a movie fragment, there can be several track fragments of different tracks. In HTTP streaming, a media representation may be a structured collection of data that is accessible to the client. The client may request and download media data information to present a streaming service to a user.

In the example of streaming 3GPP data using HTTP streaming, there may be multiple representations for video and/or audio data of multimedia content. The manifest of such representations may be defined in a Media Presentation Description (MPD) data structure. A media representation may correspond to a structured collection of data that is accessible to an HTTP streaming client device. The HTTP streaming client device may request and download media data information to present a streaming service to a user of the client device. A media representation may be described in the MPD data structure, which may include updates of the MPD.

Multimedia content may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by various characteristics, such as encoding types, e.g., by bit rate, resolution, and/or codec for video data and bit rate, language, and/or codec for audio data. The term representation may be used to refer to a section of encoded audio or video data corresponding to a particular period of the multimedia content and encoded in a particular way.

Representations of a particular period may be assigned to a group, which may be indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL). The MPD may provide the identifiers for each segment. In some examples, the MPD may also provide byte ranges in the form of a range attribute, which may correspond to the data for a segment within a file accessible by the URL or URI.

Each representation may also include one or more media components, where each media component may correspond to an encoded version of one individual media type, such as audio, video, and/or timed text (e.g., for closed captioning). Media components may be time-continuous across boundaries of consecutive media segments within one representation.

Aspects of this disclosure are generally directed to improving a user's experience when initially retrieving multimedia content and when performing bandwidth adaptation. As noted above, a client device may determine an amount of bandwidth that is currently available and select a representation based on the amount of available bandwidth and a bit rate of the representation, along with coding and rendering capabilities of the client device. A client device typically chooses the highest bit rate that is allowed by the available bandwidth. If bandwidth conditions change, the client can react by switching to a different representation, e.g., with a different bit rate.

Traditional video streaming techniques may require a client device to buffer received video data prior to displaying the video data in order for the video data to be displayed without interruption. There may be, in some instances, a tradeoff between the time that is needed to buffer video data and the manner in which the video data was encoded. That is, a client device may require a longer buffering duration for video data that has been encoded using a variable bit rate than for video data that has been encoded using a constant bit rate.

Given a fixed average rate, however, the perceptual quality of video data that has been encoded using a variable bit rate may be higher than video data that has been encoded using a constant bit rate. For example, in video coding, some frames (that is, intra-prediction mode encoded frames or I-frames) of video data are coded independently, without reference to other frames of video data. To exploit temporal redundancies between frames, other frames (that is, inter-prediction mode encoded frames such as P and B frames) are coded relative to previously coded frames (referred to as reference frames). Accordingly, video data that has been coded at a more constant rate typically includes more I-frames than video data that has been coded at a more variable rate. Thus, for a given average rate, there may be a tradeoff between the duration required for buffering the perceptual quality of the displayed video data. That is, more buffering time may be required for video data that has been coded using a variable bit rate that exhibits a higher perceived quality than for video data that has been coded using a more constant bit rate that exhibits a lower perceived quality.

The techniques of this disclosure may include providing a plurality of representations, but with each of the representations having a different associated buffering duration. Accordingly, a client device may pick a representation that has a suitable bit rate, as well as a representation that has a suitable buffering time. In an example, a client device may initially select a representation having a certain bit rate and a relatively short buffering duration (albeit relatively lower quality), buffer data of the representation, then switch to a representation of the same bit rate but having a relatively longer buffering duration (e.g., having a relatively higher quality). While the example above includes two representations having the same bit rate, as described in greater detail below, in other examples, the representations may have differing bit rates (in addition to the differing buffering times).

The point at which the client device switches to another representation may be referred to as a "switch point." That is, as described in greater detail below, the client device may switch to a representation at a so-called key frame. In general, a key frame is an intra-coded frame of a representation at which a client device may begin decoding the representation without access to earlier data of the representation if the data in the representation is in decode order. While the client device typically switches to a representation at a key frame, the client device may switch from a representation at any point in the representation. For example, the client device may switch from a first representation to a second representation at any point in the first representation, provided the client device switches to the second representation at a key frame.

In some examples, the client device may switch to the representation having the longer buffering duration after buffering an amount of data from the initial representation that is approximately equal to or greater than the longer buffering duration. According to some aspects of this disclosure, the client device may dynamically determine when to switch from the representation having the shorter buffering duration to the representation having the longer buffering duration based on the state of the buffer. Accordingly, the transition from the representation having the shorter buffering duration to the representation having the longer buffering duration may depend on network conditions. That is, if the buffer of the client device is filled relatively quickly (e.g., with a relatively high download data rate), the client device may be able to switch to the representation having the longer buffering duration more quickly than if the buffer of the client device is filled relatively slowly. Moreover, the client device may be playing data out from the buffer as other data is being retrieved. Accordingly, the client device may determine when to switch representations based on the relative speed of the download data rate compared to the play back data rate.

In an example, a server may provide a plurality of representations at a given bit rate. A first representation may be of a relatively lower quality, but may have an associated buffering duration of one second. A second representation may be of a relatively higher quality, but may have an associated buffering duration of 10 seconds. Initially, a client device may request the first representation. After buffering a certain amount of data of the first representation, e.g., 10 seconds of data (in terms of playback time), the client device may switch to the higher quality, second representation (e.g., having the relatively longer buffering duration). In this way, the client device may provide faster playback using the first representation, but also switch to a relatively higher quality representation after achieving a certain amount of buffered data. In steady network conditions, the described example may display the content without stalls or re-buffering, despite varying buffering conditions (e.g., 10 seconds).

Furthermore, the techniques of this disclosure may be used in a variety of ways to improve retrieval of video data via network streaming. In some examples, two or more representations may have the same bit rate but different switch point frequencies (referred to in this example as a target group of representations). A client device may initially begin retrieving data of a different representation at a different bit rate, but at some point determine that network bandwidth availability has changed. Accordingly, the client device may switch to the target group of representations, and in particular, retrieve data of one of the target group of representations having a higher frequency of switch points. After buffering a sufficient amount of data of this representation, the client device may switch to another one of the target group of representations having a lower frequency of switch points. For example, suppose that a client device initially retrieves data from a representation having a bit rate of 10 Mbps. At some point, the client device determines that network bandwidth has decreased, so the client device retrieves a set of representations having a lower bit rate, e.g., 5 Mbps. In particular, the client device identifies a set of representations includes one representation with switch points every half-second (in terms of playback time), and another representation with switch points every five seconds. The client device may initially retrieve data from the 5 Mbps representation with switch points every half-second, and buffer at least five seconds worth of data from this representation (again, in terms of playback time). Then, the client device may begin retrieving data from the 5 Mbps representation with switch points every five seconds. During this switch, the client device should have enough buffered data from the half-second switch point frequency representation to avoid buffer underflow, while also avoiding the necessity of executing two decoders simultaneously which may consume excess battery and processing power. Client devices may be similarly configured to switch to a set of higher bit rate representations upon determining that network bandwidth has increased. In the example above, the client device transitions to representations having the same bit rates (e.g., 5 Mbps), but having different frequencies of switch points. In other examples, and as described in greater detail below, the client device may transition to representations having different bit rates that also have different switch point frequencies. For example, the client device may switch to a representation that has relatively a lower bit rate, but that has a higher perceptual quality due to a decreased frequency in switch points. In some examples, as described in greater detail below, the client device may also select a representation to switch to based on an amount of data that has been stored to a buffer of the client device.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

As with many video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Video compression standards such as ITU-T H.261, H.262, H.263, MPEG-1, MPEG-2, H.264/MPEG-4 part 10, and the upcoming High Efficiency Video Coding (HEVC) standard, make use of motion compensated temporal prediction to reduce temporal redundancy. The encoder, such as video encoder 28, may use a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures may use the reference picture before the current picture in temporal order. In a B-picture, each block of the B-picture may be predicted from one or two reference pictures. These reference pictures could be located before or after the current picture in temporal order.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units are transmitted on a different channel than the other NAL units.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bit rates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise a combination of audio data and video data, e.g., one or more audio elementary stream and one or more video elementary streams. Each PES packet may include a stream_id that identifies the elementary stream to which the PES packet belongs. Encapsulation unit 30 is responsible for assembling elementary streams into video files of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In accordance with the techniques of this disclosure, portions of manifest file 66 may be stored in separate locations, e.g., locations of storage medium 62 or another storage medium, potentially of another device of network 74 such as a proxy device.

In some examples, representations 68 may be separated into adaptation sets. In some instances, an adaptation set may also be referred to as a "representation group." That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bit rates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 72. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bit rate, and other descriptive characteristics of representations 68. Client device 40 may retrieve the MPD of a media presentation to determine how to access segments of representations 68.

In particular, web application 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Web application 52 may comprise, for example, a web browser or a media client configured to submit HTTP GET and partial GET requests. Web application 52 may correspond to software instructions executed by one or more processors or processing units (not shown) of client device 40. In some examples, all or portions of the functionality described with respect to web application 52 may be implemented in hardware, or a combination of hardware, software, and/or firmware, where requisite hardware may be provided to execute instructions for software or firmware.

Web application 52 may compare the decoding and rendering capabilities of client device 40 to characteristics of representations 68 indicated by information of manifest file 66. Web application 52 may initially retrieve at least a portion of manifest file 66 to determine characteristics of representations 68. For example, web application 52 may request a portion of manifest file 66 that describes characteristics of one or more adaptation sets, in accordance with the techniques of this disclosure. Web application 52 may select a subset of representations 68 (e.g., an adaptation set) having characteristics that can be satisfied by the coding and rendering capabilities of client device 40. Web application 52 may then determine bit rates for representations in the adaptation set, determine a currently available amount of network bandwidth, and retrieve segments from one of the representations having a bit rate that can be satisfied by the network bandwidth.

In general, higher bit rate representations may yield higher quality video playback, while lower bit rate representations may provide sufficient quality video playback when available network bandwidth decreases. Accordingly, when available network bandwidth is relatively high, web application 52 may retrieve data from relatively high bit rate representations, whereas when available network bandwidth is low, web application 52 may retrieve data from relatively low bit rate representations. In this manner, client device 40 may stream multimedia data over network 74 while also adapting to changing network bandwidth availability of network 74.

As noted above, aspects of this disclosure are generally directed to improving a user's experience when initially retrieving multimedia content and when performing bandwidth adaptation. In some examples, a client device, such as client device 40, may initially select a representation 68 having a certain bit rate and a relatively short buffering duration (e.g., albeit relatively lower quality), buffer data of the representation, then switch to a representation of the same bit rate but having a relatively longer buffering duration (e.g., having a relatively higher quality). While switching between representations may be described herein as being carried out by client device 40, it should be understood that an application being executed by client device 40, such as web application 52, may also make such a determination.

Client device 40 may switch between representations 68 at key frames. For example, key frames are frames of a representation 68 at which a client device may begin decoding the representation 68 without access to earlier data of the representation 68. Accordingly, key frames are encoded as I-frames. Client device 40 may switch from one representation 68 to another by retrieving data up to the temporal location of a key frame of the representation 68 to be switched to, then retrieving data starting at the key frame of the representation 68 to be switched to. Key frames may therefore be referred to as switch points of a representation, or simply switch points.

As noted above, client device 40 need not switch from a representation 68 at a key frame. For example, in certain instances, client device may switch from a representation 68 between switch points of the representation 68. In such instances, client device 40 may retrieve more of a representation 68 that necessary. That is, client device 40 may retrieve data from the representation 68 up to a switch point, but switch to another representation before reaching the switch point. In such instances, client device 40 may not play back the extra data retrieved from the switched-from representation, which may be referred to as overlap.

As an alternative, to reduce the overlap, the client device 40 may only retrieve data from the representation 68 up to the point that allows playback up to the time that playback will begin for the representation to which the client device 40 switches. Thus, the client device 40 may not need to download all the data up to the next switch point in representation 68 to enable seamless switching from representation 68 to another representation. For example, suppose the sequence of frames in representation 68 is IPBBPBBPBBPBBBBI and these frames are to be played back in the order IBBPBBPBBPBBPBBI. In this example, there is a switch point at frames 1 and 16. Suppose further that the switch point for switch to representation is at the presentation time of the $10^{th}$ frame of representation 68 to be played back, i.e., when the third P-frame in this playback sequence is to be played back, and thus this third P-frame and all subsequent frames are not to be played back. Client device 40 may then download IPBBPBBPBB frames from representation 68, and thus be able to play back IBBPBBPBBP from representation 68. However, only the first 9 of these 10 frames in play back order are actually played back in the seamless switch from representation 68 to the switched-to representation. In this example, the data downloaded from representation 68 that is not played back, i.e., the data in the overlap, is the third P-frame, and thus the client device 40 does not have to download the last 5 frames preceding the next switch point at frame 16 in the representation 68 in order to enable the seamless switch.

In general, the number of switch points in a given representation 68 may have an inverse relationship with a buffering duration for the representation 68. That is, a representation 68 having relatively few switch points may have a long buffering duration. Conversely, a representation 68 having relatively numerous switch points may have a relatively short buffering duration.

Although more frequent switch points allow client device 40 to switch between representations 68 more frequently, key frames do not exploit as much redundancy as P or B frames, and therefore typically consume more coding bits than P or B frames. However, when switch points are provided less frequently in a representation 68, a client device 40 attempting to decode the representation 68 may need to wait for a lengthy period of time before receiving the next key frame, which may cause user experience to suffer (e.g., due to delayed starting of playback for the representation 68 initially or after a switch between representations 68). Therefore, strategic decisions are typically made regarding how frequently to include switch points in representations 68 of multimedia content.

The term "frequency" when describing the locations of switch points refers to an interval between switch points, which may describe a temporal distance between switch points in the representation 68. While the frequency may be relatively steady, the temporal distance between switch points may vary between switch points by a certain margin, in some examples.

In some examples, the techniques of this disclosure involve providing information from the server device 60 to the client device 40 indicative of distances between switch points of various representations 68 of the multimedia content. For example, as described in greater detail below with respect to FIG. 2, server device 60 may provide information to the client device 40 indicative of intervals between switch points for each representation (e.g., switch point frequency within a representation) within a manifest file/MPD. The client device 40 may use this information to initially select a representation 68 having relatively frequent switch points (albeit relatively lower quality), buffer data of the representation 68, then switch to a representation 68 having relatively higher quality at a future switch point of the higher-quality representation 68.

In some examples, server device 60 may assign the same bit rate to a group of representations 68, but assign different frequencies of switch points to the representations 68 in the group. Because relatively more bits are used to encode switch points (due to switch points being coded as I-frames), the representations 68 with more frequent switch points will tend to have relatively lower quality, but allow client devices to begin playback more quickly in the average case. Therefore, using information indicative of distances between switch points for the representations 68, client device 40 may initially retrieve and buffer data from a representation 68 having relatively more frequent switch points. After buffering enough data from the initial representation to avoid gaps in playback, client device 40 may begin requesting and buffering data starting at a switch point of a different representation 68 having less frequent switch points, but relatively higher quality.

Although the example above describes a group of representations 68 having the same bit rate, these techniques may also be applied to groups of representations 68 having different bit rates. For example, client device 40 may begin requesting and buffering data of a representation 68 having an initial bit rate, for example at 500 Kbps with a switch point each 1 second. After buffering enough data from the initial representation to avoid gaps in playback, client device 40 may switch to a representation 68 having a relatively lower bit rate than the initial bit rate, but having the same or a higher perceptual quality (e.g., due to a decrease in the frequency of switch points), for example at 400 Kbps with a switch point each 5 seconds.

In an example, during playback startup (or after a seek), client device 40 may select an initial representation 68 having a relatively high frequency of switch points, for example 500 Kbps with switch points each 1 second. After buffering at least some of the initial representation 68, client device 40 may transition to a representation 68 having a lower frequency of switch points that is coded more efficiently (which may result in an increased perceptual quality), for example 450 Kbps with switch points each 3 seconds.

In some examples, client device 40 may select a representation 68 based on an amount of data that has been buffered. For example, in general, when a buffer of client device 40 is nearly empty, client device 40 may switch to a representation 68 having relatively frequent switch points to allow a seamless transition to the representation 68. That is, client device 40 may need a relatively increased opportunity to switch representations 68 as the buffer of client device 40 empties in order to avoid an interruption in playback (e.g., re-buffering). In contrast, after the buffer has at least partially filled, client device 40 may transition to a representation 68 having relatively fewer switch points that is coded more efficiently (which may result in an increased perceptual quality).

Furthermore, because the buffer is fuller and there is less risk of a stall or re-buffer event, the bit rate of the transition to representation 68 may be a higher bit rate, which allows an increased play back quality due to more efficient video encoding (because there are less switch points) and due to higher bit rate. That is, client device 40 may need fewer opportunities to switch representations 68 when the buffer is relatively full, because the full buffer reduces the risk of playback interruption.

Thus, when selecting a representation 68 with less frequent switch points, the chosen representation may be at a lower bit rate and the same or better quality, thus reducing the amount of data needed to play back and maintain high quality play back. The chosen representation may also be at equal or higher bit rate with even better quality, thus providing an even higher quality playback experience. Accordingly, client device 40 can afford to retrieve a representation 68 having less frequent switch points, thereby retrieving content having a better perceptual quality for the same or lower bit cost, or even better quality with a higher bit cost, but in all cases with minimal chances of causing a playback stall or a re-buffering event.

However, in some instances, the amount of bandwidth that is available for client device 40 may substantially increase. In such instances, client device 40 may begin retrieving a representation 68 having a higher bit rate that has a relatively high frequency of switch points. The high frequency of switch points may provide an increased opportunity to switch to the higher bit rate representation, thereby allowing client device 40 to take advantage of the increased bandwidth to improve the experience of a user more quickly.

According to some aspects, representations 68 of an adaptation set may alternate between a representation 68 having relatively frequent switch points and a representation 68 having relatively infrequent switch points for each consecutive bit rate representation. For example, there may be representations at 300 Kbps, 500 Kbps, 800 Kbps, 1300 Kbps, 2100 Kbps, and 3400 Kbps with respective switch point frequencies of 1 second, 3 seconds, 1 second, 3 seconds, 1 second, and 3 seconds. In such examples, client device 40 may select a representation 68 from the adaptation set based on both changes in the available bandwidth (e.g., download speed) and the status of a buffer of client device 40 (e.g., whether the buffer is relatively full or empty). For example, if the buffer is relatively close to empty and/or the amount of bandwidth that is available is drastically reduced, client device 40 may choose a representation that has a relatively lower bit rate having relatively frequent switch points.

If, however, the buffer is nearly full and/or there is not as a drastic of a reduction in the available bandwidth, client device 40 may choose a representation that has relatively low frequency switch points with a lower bit rate. This option of providing representations of an adaptation set with a mix of lower and higher frequency switch points may in some cases provide a good balance between video encoding efficiency (less frequent switch points) and reaction time to changes in network conditions (more frequent switch points).

In another example, according to aspects of this disclosure, representations 68 having relatively lower bit rates may have relatively frequent switch points, while representations having relatively higher bit rates may have less frequent switch points. For example, there may be representations at 300

Kbps, 500 Kbps, 800 Kbps, 1300 Kbps, 2100 Kbps, and 3400 Kbps with respective switch point frequencies of 1 second, 1 second, 1 second, 3 seconds, 3 seconds, and 3 seconds. In this example, client device 40 may select a representation 68 having a low bit rate for startup (e.g., below the rate available based on bandwidth conditions) and quickly move to a higher bit rate representation 68, for example, after filling the buffer. Client device 40 may continue to retrieve representations 68 having a higher bit rate to achieve a high quality play back while ameliorating the risk of stalls or re-buffering as long as the buffer is relatively full. This option of providing representations of an adaptation set with lower frequency switch points for lower bit rates and higher frequency switch points for higher switch points may provide high quality video encoding efficiency when the buffer is relatively full (which can be the majority of the time if network conditions are usually good) with reasonable strategies to react to quick deterioration in network conditions (more frequent switch points for the lower bit rate representations allow switching to these representations quickly when conditions deteriorate).

A client device 40 may select a representation 68 having a bit rate that is substantially below an available download rate when the buffer of client device 40 is not as full, thereby reducing the likelihood of stalling or re-buffering. As the buffer fills, client device 40 may begin to retrieve representations 68 having a bit rate that is near the download rate. Accordingly, client device 40 may select a representation having a higher bit rate with fewer switch points and a decreased probability of stalling or re-buffering, because if the download rate decreases client device 40 has ample opportunity to switch to a lower bit rate representation 68 (due to the amount of data in the buffer). In addition, when the download rate decreases and client device 40 switches to a representation 68 having a lower bit rate, the representation 68 having the lower bit rate also has more frequent switch points. Accordingly, client device 40 may switch to the lower bit rate representation 68 relatively quickly, which further provides protection against stalls or re-buffering when the download rate drops.

In an alternative example, according to aspects of this disclosure, representations 68 having relatively lower bit rates may have relatively less frequent switch points, while representations having relatively higher bit rates may have more frequent switch points. In this example, representations 68 coded at a relatively lower bit rate may suffer in quality more than representations 68 coded at a higher bit rate with more frequent switch points. Accordingly, client device 40 may initially select a representation 68 having a relatively low bit rate, but may switch to a representation 68 having a higher bit rate (at a switch point of the higher bit rate representation 68, which may not coincide with a switch point for the lower bit rate representation) if the buffer is filling up quickly.

In some examples, rather than initially selecting a representation based on the bit rate of the representation 68 and the amount of bandwidth available, client device 40 may be configured to initially select a representation 68 based on the frequency of switch points, so long as the bit rate of the selected representation 68 does not exceed the currently available bandwidth. After buffering enough data of the initially selected representation 68, client device 40 may begin requesting data from a higher bit rate representation 68, which may have less frequent switch points than the initially selected representation 68.

In a particular example, server device 60 may broadcast a representation 68 of multimedia content with relatively long periods of time between switch points (e.g., 10 seconds of playback time). Client device 40 may be configured to request a unicast of a different representation 68 of the multimedia content having relatively more frequent switch points initially, then switch to the broadcast after buffering sufficient data of the unicast representation 68. Similarly, if reception of the broadcast is interrupted, the client device 40 may again begin retrieving the other representation using unicast, and switch back to the broadcast after buffering a sufficient amount of data of the unicast representation 68.

In another example, two or more representations may have the same bit rate but different switch point frequencies (referred to in this example as a target group of representations, which may be included in an adaptation set). Client device 40 may initially begin retrieving data of a certain representation at a certain bit rate, but at some point determine that network bandwidth availability has changed. Accordingly, client device 40 may switch to a target group of representations (e.g., an adaptation set of representations having the same or approximately the same bit rate, but having different temporal intervals between switch points), and in particular, retrieve data of one of the target group of representations having a higher frequency of switch points. After buffering a sufficient amount of data of this representation, client device 40 may switch to another one of the target group of representations having a lower frequency of switch points.

For example, suppose that client device 40 initially retrieves data from a representation having a bit rate of 10 Mbps. At some point, client device 40 determines that network bandwidth has decreased, so client device 40 determines a set of representations (e.g., an adaptation set) having a lower bit rate, e.g., 5 Mbps. In particular, client device 40 may determine that the set of representations includes one representation with switch points every half-second (in terms of playback time), and another representation with switch points every five seconds. Client device 40 may initially retrieve data from the 5 Mbps representation with switch points every half-second, and buffer at least five seconds worth of data from this representation (again, in terms of playback time). Then, client device 40 may begin retrieving data from the 5 Mbps representation with switch points every five seconds. During this switch, client device 40 should have enough buffered data from the half-second switch point frequency representation to avoid buffer underflow, while also avoiding the necessity of executing two decoders simultaneously which may consume excess battery and processing power. Client device 40 may be similarly configured to switch to a set of higher bit rate representations upon determining that network bandwidth has increased.

The server device 60 may be configured to temporally align switch points across representations 68. That is, for two representations 68 having different frequencies of switch points, the switch points of the representation 68 having the lower frequency of switch points occur at the same temporal locations (during playback) as switch points of the representation 68 having the higher frequency of switch points. In this manner, the client device may be configured to buffer data of a full segment of the representation 68 having the higher frequency switch points, and switch to the representation 68 having the lower frequency switch points following the segment. Accordingly, the client device 40 may avoid retrieving and decoding overlapping data from different representations 68 when switching between the representations 68. As noted above, however, client device 40 need not switch from a particular representation 68 at a switch point. In addition, while temporal alignment of switch points may help to avoid retrieving overlapping data, switch points need not be temporally aligned to perform the techniques of this disclosure.

In some examples, client device 40 may maintain a data structure indicative of particular representations 68 from which client device 40 requested data for multimedia content 64. Client device 40 may also maintain indications of exactly what was played out, and at what time. That is, the data structure may provide information representative of start and end times in both real (or "wall clock") time and presentation time. The data structure may further provide information representative of an initial startup time and the start of playback. After finishing playback of multimedia content 64, client device 40 may send the data structure to server device 60 and/or content preparation device 20. Server device 60 and/or content preparation device 20 may use information received from client device 40 to determine more optimal ways of improving quality of experience, such as to reduce pauses in playback.

Network interface 54 may receive and provide data of segments of a selected representation to web application 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, web application 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, web application 52, and/or decapsulation unit 50 may comprise an integrated circuit, a microprocessor, and/or a wireless communication device, such as a cellular telephone.

Figure 2:
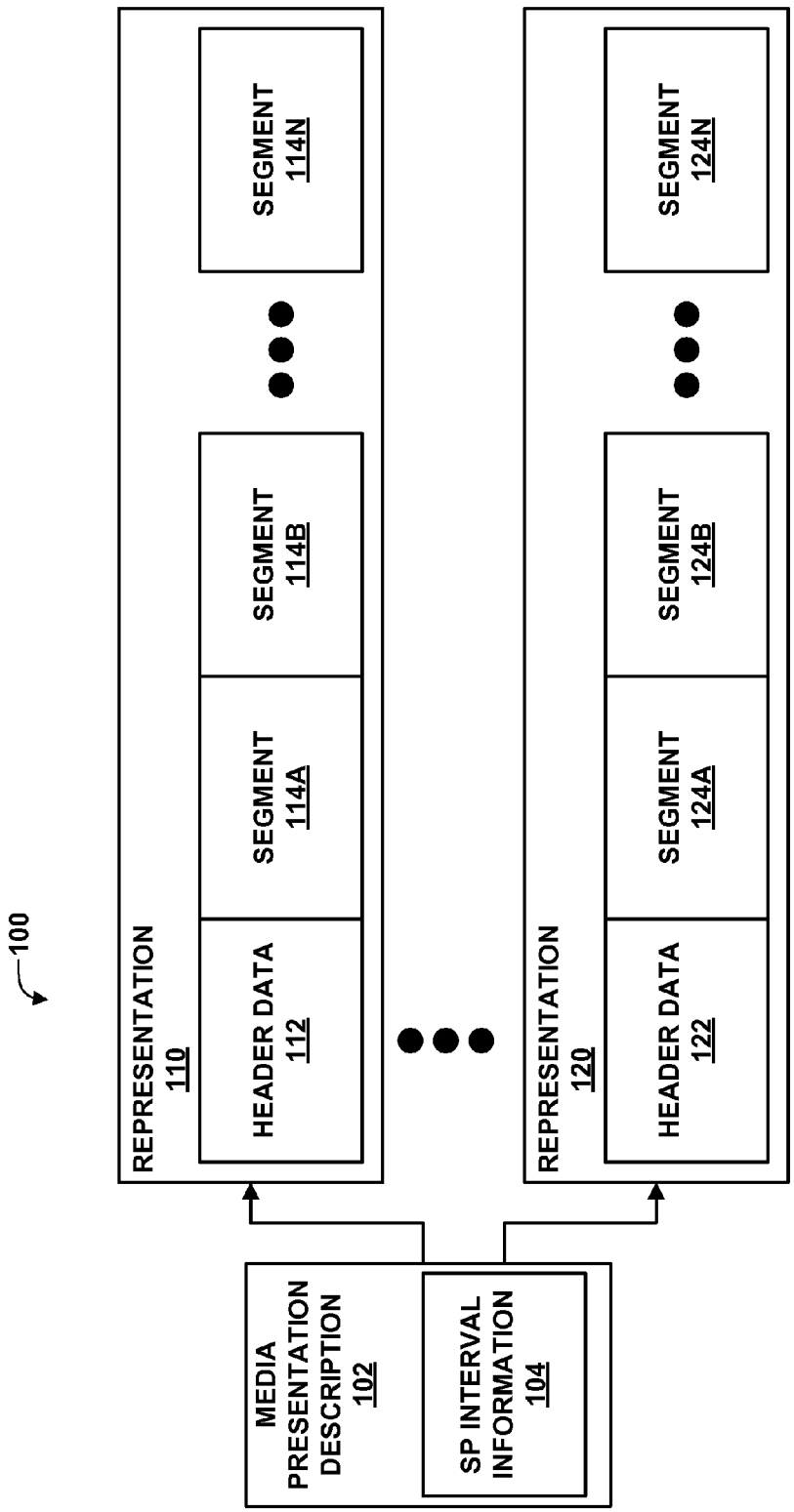
FIG. 2 is a conceptual diagram illustrating elements of example multimedia content.

FIG. 2 is a conceptual diagram illustrating elements of an example multimedia content 100. Multimedia content 100 may correspond to multimedia content 64 (FIG. 1), or another multimedia content stored in memory 62. In the example of FIG. 2, multimedia content 100 includes media presentation description (MPD) 102 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110, 120 as a matter of convenience. In some examples, there may be different numbers of movie fragments between representations 110, 120.

Figure 4:
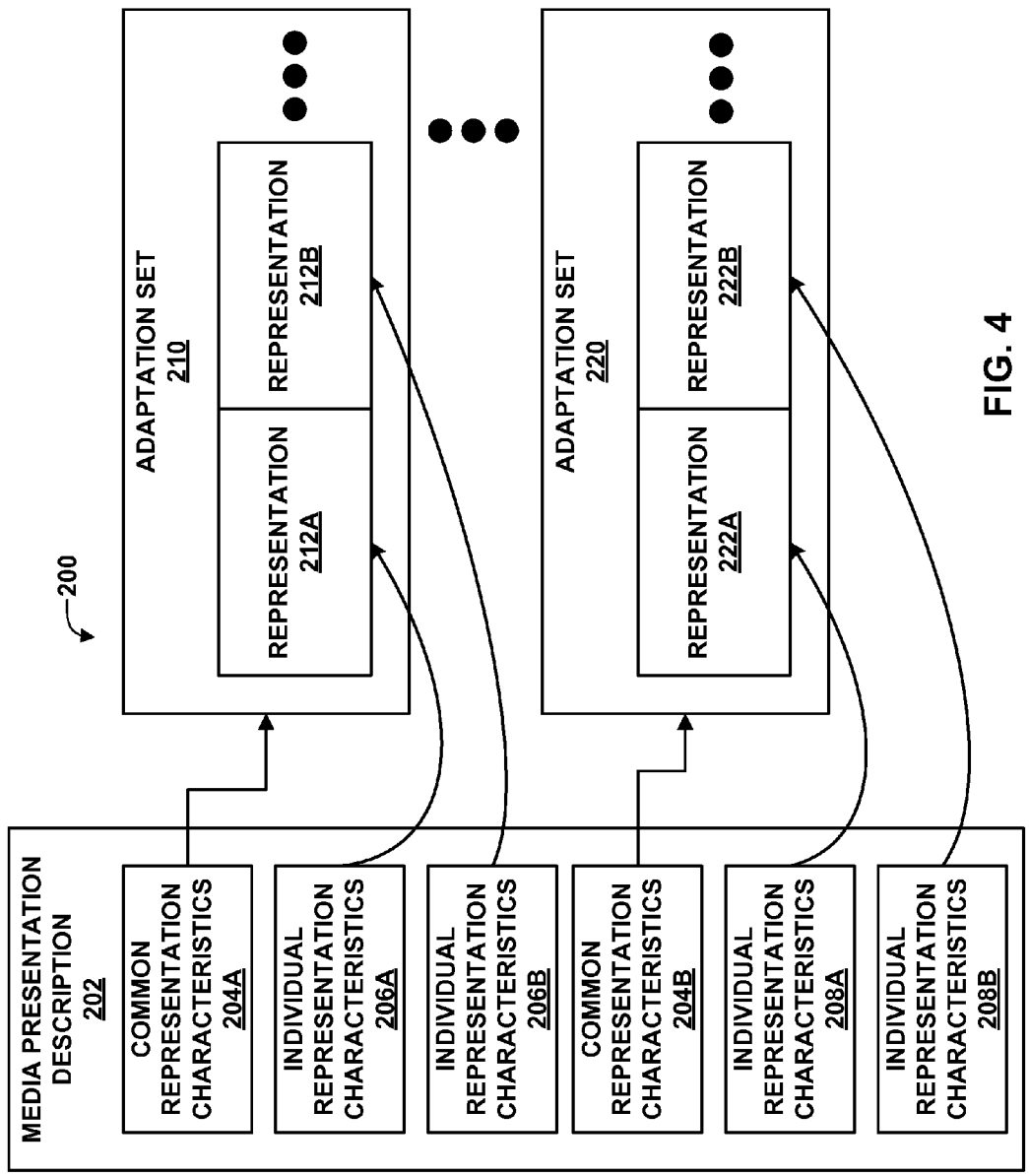
FIG. 4 is a conceptual diagram illustrating an example multimedia content including a media presentation description (MPD) and various adaptation sets.
Figure 5:
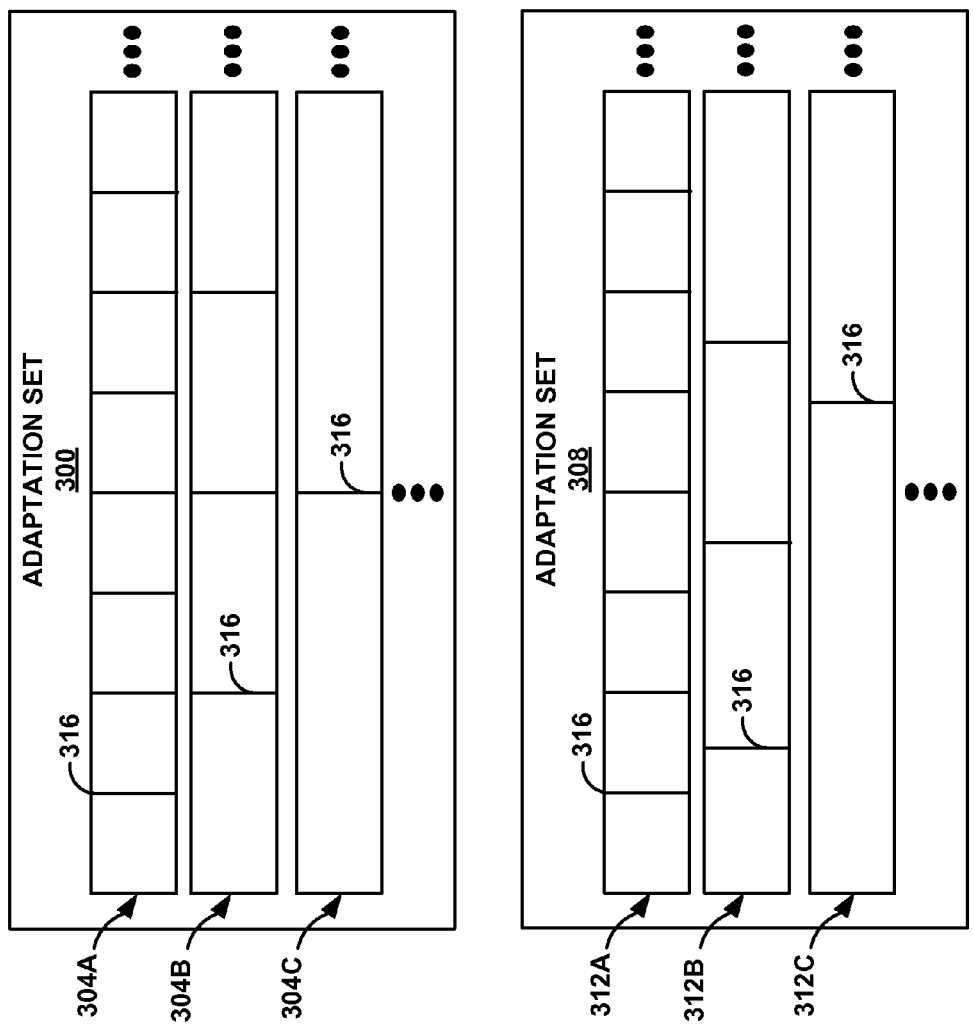
FIG. 5 is a conceptual diagram illustrating example representations, according to aspects of this disclosure.

MPD 102 may comprise a data structure separate from representations 110-120. MPD 102 may correspond to manifest file 66 of FIG. 1. Likewise, representations 110-120 may correspond to representations 68 of FIG. 1. In general, MPD 102 may include data that generally describes characteristics of representations 110-120, such as coding and rendering characteristics, adaptation sets, a profile to which MPD 102 corresponds, text type information, camera angle information, rating information, and the like. Remote periods may also be referred to as external periods. FIGS. 4-5, discussed in greater detail below, illustrate various examples of multimedia content with various elements included in either or both of an MPD and/or representations (such as within segments of representations or header data of representations).

According to aspects of this disclosure, for example, MPD 102 and/or header data 112, 122 may include SP interval information 104 that indicates a frequency (or an interval) of switch points for representations 110, 120. That is, SP interval information 104 may provide an indication of the temporal frequency with which switch points (e.g., also referred to as key frames) occur in a given duration. Additionally or alternatively, SP interval information 104 may provide an indication of the duration, or interval between switch points. Any or all of the MPDs of FIGS. 4-5 may correspond substantially to MPD 102 of FIG. 2.

Header data 112, when present, may describe characteristics of segments 114, e.g., temporal locations of random access points, which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 102.

Segments 114 include one or more coded video samples, each of which may include frames or slices of video data. Each of the coded video samples of segments 114 may have similar characteristics, e.g., height, width, and bandwidth requirements. Such characteristics may be described by data of MPD 102, though such data is not illustrated in the example of FIG. 2. MPD 102 may include characteristics as described by the 3GPP Specification, with the addition of any or all of the signaled information described in this disclosure.

Each of segments 114, 124 may be associated with a unique uniform resource identifier (URI), e.g., a uniform resource locator (URL). Thus, each of segments 114, 124 may be independently retrievable using a streaming network protocol, such as DASH. In this manner, a destination device, such as client device 40, may use an HTTP Get request to retrieve segments 114 or 124. In some examples, client device 40 may use HTTP partial Get requests to retrieve specific byte ranges of segments 114 or 124.

Segments 114, 124 may include switch points for representations 110, 120. A switch point may generally correspond to a random access point (RAP). Various representations may include switch points at different intervals, e.g., RAPs that occur at different frequencies in the representations. For example, each of segments 114 of representation 110 may include a switch point, whereas segments 124A, 124C, 124E, and so on of representation 120 may include switch points, but segments 124B, 124D, and so on of representation 120 might not include switch points.

Accordingly, in this example, client device 40 may initially retrieve data from representation 110, then switch to representation 120 after retrieving a sufficient amount of data. For example, client device 40 may retrieve segments 114A and 114B of representation 110. In the case that segments 124A and 124C of representation 120 include random access points, client device 40 may retrieve segments 114A and 114B of representation 110, then determine that an amount of data of representation 110 has been buffered with a temporal playback time exceeding the time between switch points of representation 120. Accordingly, after retrieving data of segments 114A and 114B of representation 110, client device 40 may retrieve data of segment 124C, which follows segment 124B in representation 120.

Figure 3:
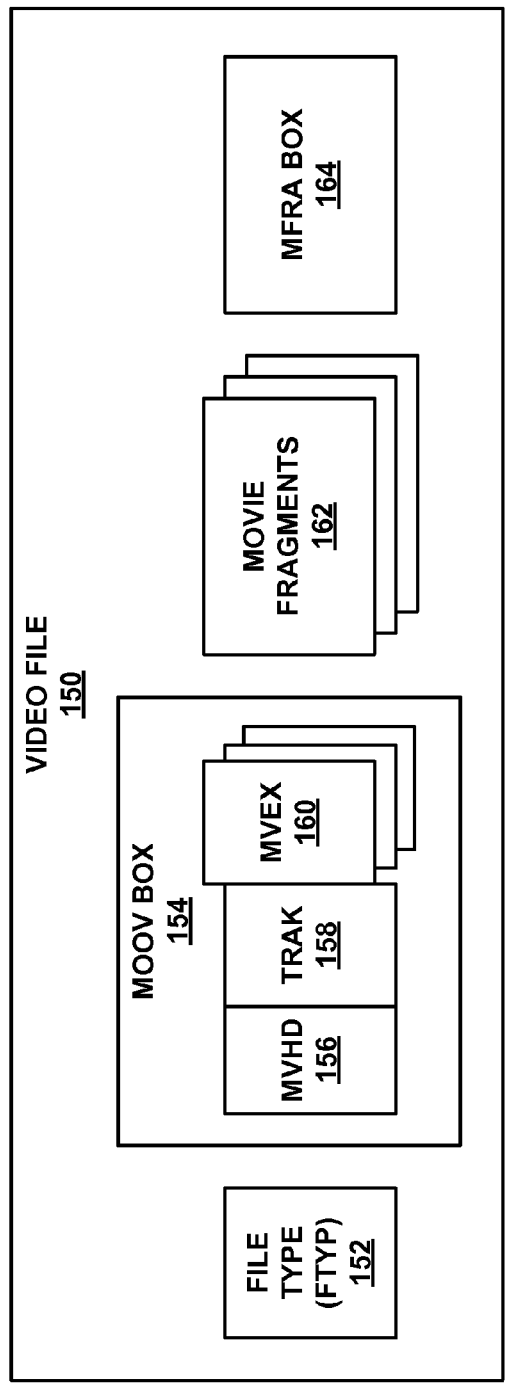
FIG. 3 is a block diagram illustrating elements of an example video file, which may correspond to a segment of a representation of multimedia content.

FIG. 3 is a block diagram illustrating elements of an example video file 150, which may correspond to a segment of a representation, such as one of segments 114, 124 of FIG. 2. Each of segments 114, 124 may include data that conforms substantially to the arrangement of data illustrated in the example of FIG. 3. Similarly, segments of FIGS. 4-5 discussed below may also conform substantially to the structure of video file 150. As described above, video files in accordance with the ISO base media file format and extensions thereof store data in a series of objects, referred to as "boxes." In the example of FIG. 3, video file 150 includes file type (FTYP) box 152, movie (MOOV) box 154, movie fragment (MOOF) boxes 162, and movie fragment random access (MFRA) box 164.

File type (FTYP) box 152 generally describes a file type for video file 150. File type box 152 may include data that identifies a specification that describes a best use for video file 150. File type box 152 may be placed before MOOV box 154, movie fragment boxes 162, and MFRA box 164.

Figure 7:
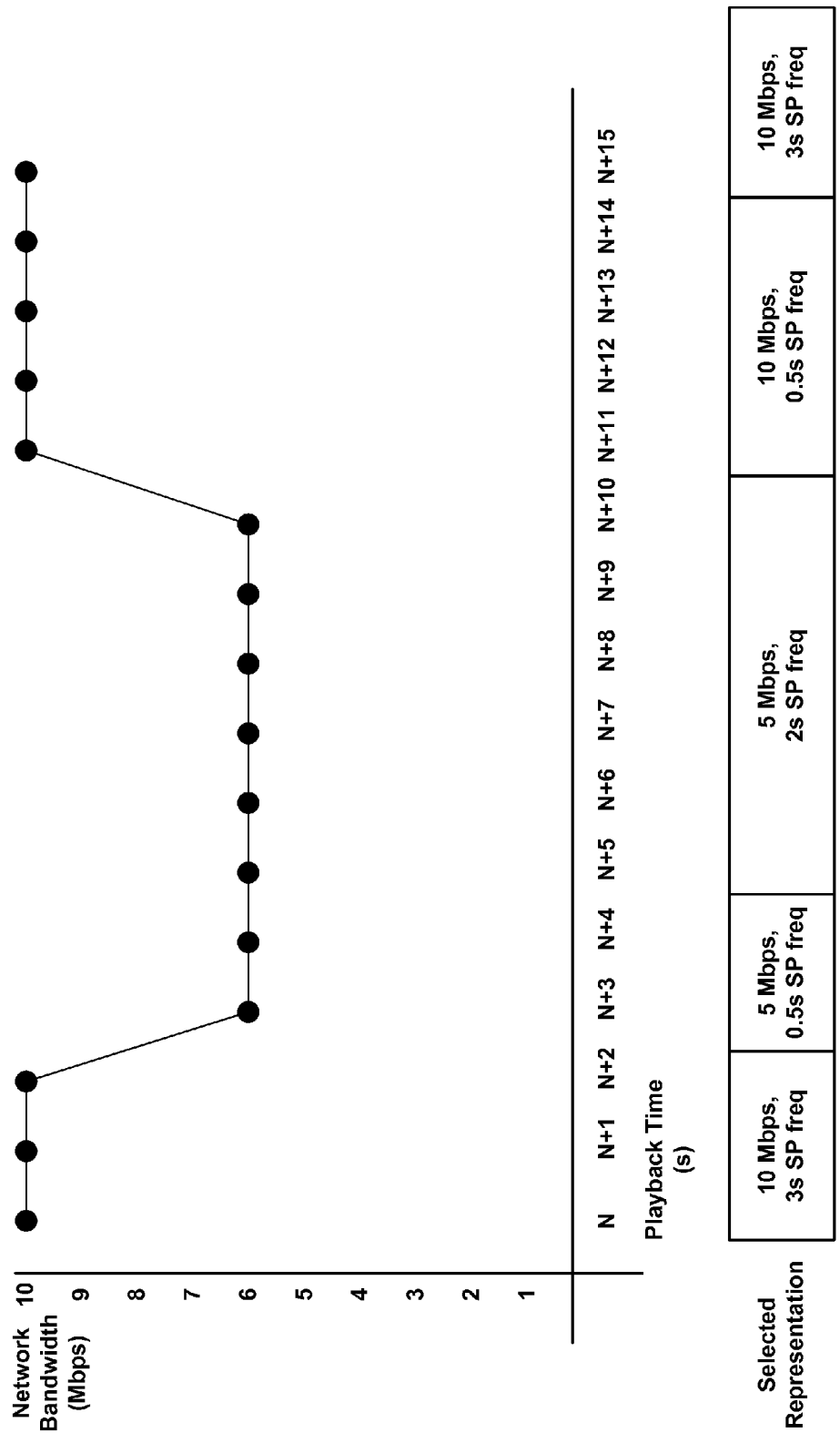
FIG. 7 is a conceptual diagram that graphically represents an example of a determined amount of network bandwidth, and a corresponding indication of a representation from which data is retrieved.

In some examples, a segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 3, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 162, which may be referenced by data of TRAK box 158.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 162, e.g., to signal that video file 150 includes movie fragments 162, in addition to video data included within MOOV box 154, if any. In the context of streaming video data, coded video pictures may be included in movie fragments 162 rather than in MOOV box 154. Accordingly, all coded video samples may be included in movie fragments 162, rather than in MOOV box 154.

MOOV box 154 may include a number of MVEX boxes 160 equal to the number of movie fragments 162 in video file 150. Each of MVEX boxes 160 may describe characteristics of a corresponding one of movie fragments 162. For example, each MVEX box may include a movie extends header box (MEHD) box that describes a temporal duration for the corresponding one of movie fragments 162.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 162. Encapsulation unit 30 may further signal the presence of a sequence data set and/or sequence level SEI messages as being present in one of movie fragments 162 within the one of MVEX boxes 160 corresponding to the one of movie fragments 162.

Movie fragments 162 may include one or more coded video pictures. In some examples, movie fragments 162 may include one or more groups of pictures (GOPs), each of which may include a number of coded video pictures, e.g., frames or pictures. In addition, as described above, movie fragments 162 may include sequence data sets in some examples. Each of movie fragments 162 may include a movie fragment header box (MFHD, not shown in FIG. 3). The MFHD box may describe characteristics of the corresponding movie fragment, such as a sequence number for the movie fragment. Movie fragments 162 may be included in order of sequence number in video file 150.

MFRA box 164 may describe random access points within movie fragments 162 of video file 150. MFRA box 164 is generally optional and need not be included in video files, in some examples. Likewise, a client device, such as client device 40, does not necessarily need to reference MFRA box 164 to correctly decode and display video data of video file 150. MFRA box 164 may include a number of track fragment random access (TFRA) boxes (not shown) equal to the number of tracks of video file 150, or in some examples, equal to the number of media tracks (e.g., non-hint tracks) of video file 150.

In some examples, video file 150 may additionally include a segment index (SIDX) box (not shown in this example). The SIDX box may occur at or near the beginning of video file 150, and may provide an indication of a location (e.g., starting byte and length or byte range) of a RAP for video file 150. Alternatively, a representation may include a SIDX box in header information for the representation, such as header data 112, 122 (FIG. 2). In some examples, client device 40 may be configured to implicitly determine frequencies (or intervals) between switch points for a representation including video file 150 based on information provided by one or more SIDX boxes of the representation. For example, by determining locations of RAPs from SIDX boxes of the representation, and by determining associated timing information for the RAPs, client device 40 may determine relative temporal intervals between RAPs for the representation. As still another example, the SIDX box of a representation may provide an explicit indication of frequencies of or intervals between switch points for the representation.

FIG. 4 is a conceptual diagram illustrating an example multimedia content 200 including MPD 202 and adaptation sets 210-220. Multimedia content 200 may correspond to multimedia content 64 (FIG. 1), or another multimedia content stored in memory 62. In this example, representations of multimedia content 200 are arranged by adaptation set. That is, representations with a common set of characteristics may be formed into an adaptation set, which provides for simplified network bandwidth adaptation.

In this example, MPD 202 includes common representation characteristics 204A that includes information describing common characteristics of adaptation set 210 and common representation characteristics 204B describing common characteristics of adaptation set 220. The common characteristics may include coding and/or rendering characteristics of the representations, such as a codec, profile and level of the codec to which the representations in the representation conform, pixel resolution, frame rate, or other characteristics of representations.

In accordance with the techniques of this disclosure, the characteristics may include a text type value, a camera angle value, and/or a rating value in addition to the characteristics discussed above. The text type value may describe characteristics of text to be displayed with the video data (e.g., closed captioning text). The text type value may describe, for example, a language of the text, a location on the screen at which to display the text, font and/or size of the text, or other characteristics of the text.

The camera angle value may describe a real-world horizontal camera position for a camera used (either physically or conceptually) to generate coded video data of corresponding representations. Using the camera angles, a client device may select data from two or more representations to be displayed substantially simultaneously, e.g., to produce a three-dimensional video playback effect. The horizontal real-world camera locations may enable the client device to select representations to increase or decrease the relative amount of depth in the three-dimensional playback of the video data.

The rating may describe content suitability for particular audiences. For example, in the United States, the Motion Picture Association of America defines ratings including G, PG, PG-13, R, and NC-17. As another example, in the United Kingdom, the British Board of Film Classification defines ratings including U, PG, 12A, 12, 15, 18, and R18. As yet another example, in the Republic of China (Taiwan), categories of motion pictures include a general audiences category, a protected category, a parental guidance category, and a restricted category.

By providing common characteristics 204 of respective adaptation sets, e.g., adaptation sets 210-220, a client device (e.g., client device 40) may select an appropriate one of adaptation sets 210-220, based at least in part on the corresponding common representation characteristics 204. In the example of FIG. 4, MPD 202 also includes individual representation characteristics 206A, 206B, 208A, and 208B, corresponding respectively to representations 212A, 212B, 222A, 222B. Individual representation characteristics 206A, 206B, 208A, and 208B may include information representative of characteristics of representations 212A, 212B, 222A, 222B not indicated by common representation characteristics 204. For example, individual representation characteristics 206A, 206B, 208A, and 208B may include information representative of bit rates for respective ones of representations 212A, 212B, 222A, 222B.

Representations of an adaptation set may be considered mutually exclusive, in that they may represent the same content (same video, same language audio, etc.) with different encoding or other parameters. MPD 202 may provide information for selecting one of adaptation sets 210-220, e.g., common representation characteristics 204. This information may include information indicative of whether a client can decode and render a given representation. In this manner, the client device may remove from consideration representations that the client device is incapable of decoding and/or rendering. Accordingly, client device 40 may select a suitable adaptation set that can be decoded and rendered, then select a representation from the group based on, e.g., network bandwidth availability.

According to aspects of this disclosure, an adaptation set, such as one of the adaptation sets 210, 220, and the like, may include a plurality of representations having the same, or approximately the same bit rate, but including different intervals of switch points. Accordingly, the representations within the adaptation set may be of varying quality, and may have varying associated buffering durations (e.g., each of the representations within an adaptation set may have an alternative associated minBufferTime, as referred to in the DASH standard). That is, a noted above, a representation with a relatively greater number of switch points may have a relatively shorter buffering duration than a representation with fewer switch points. However, for the given bit rate of the adaptation set, the representation with the greater number of switch points may be of a relatively lower quality than the representation with fewer switch points.

According to aspects of this disclosure, client device 40 may select an adaptation set having a plurality of representations with the same, or approximately the same bit rate. Client device 40 may initially select a representation having a certain bit rate and a relatively short buffering duration (e.g., albeit relatively lower quality), buffer data of the representation, then switch to a representation of the same bit rate but having a relatively longer buffering duration (e.g., having a relatively higher quality). According to other aspects, as noted above with respect to FIG. 2, adaptation sets may have differing bit rates. For example, an adaptation set may have representations 68 that alternate between a representation 68 having relatively frequent switch points and a representation 68 having relatively infrequent switch points for each consecutive bit rate representation.

Client device 40 may also be configured with user preferences for, e.g., rating, language, and/or depth. Accordingly, client device 40 may also select one or more adaptation sets such that the selected groups conform to the user preferences. Client device 40 may then select a subset of available adaptation sets that can be played concurrently. When client device 40 is only capable of displaying one view, client device 40 may elect to retrieve data only from one representation. On the other hand, when client device 40 is stereo view or multiview capable, client device 40 may retrieve data from two or more representations.

After selecting one or more adaptation sets, client device 40 may select representations from the adaptation sets based on, e.g., available network bandwidth. As available network bandwidth changes (e.g., increases or decreases), client device 40 may adjust selections of representations from the adaptation sets to adapt to the changing network bandwidth conditions. Of course, client device 40 may also change representation selections if user preferences or device capabilities (e.g., decoding and rendering capabilities) change.

According to aspects of this disclosure, client device 40 may select an adaptation set having a plurality of representations with the same, or approximately the same bit rate. Client device 40 may initially select a representation having a certain bit rate and a relatively short buffering duration (e.g., albeit relatively lower quality), buffer data of the representation, then switch to a representation of the same bit rate but having a relatively longer buffering duration (e.g., having a relatively higher quality).

Common representation characteristics 204 may correspond to RepresentationGroup XML elements of MPD 202, in some examples. Individual representation characteristics may correspond to sub-elements of corresponding RepresentationGroup elements of MPD 202, in some examples.

By grouping common characteristics of representations together, various optimizations may be achieved. For example, many representations may have the same values for various parameters. Thus, individually signaling characteristics in the MPD may result in substantial duplication in the MPD to signal characteristics individually. Many client devices are configured to discard the vast majority of the MPD that is received. There could therefore be optimization in the portion of the MPD that the client device receives. Moreover, if an Adaptation set is discarded, the client device may have no need to access information currently present in the MPD (URLs, etc.) for the discarded representation or adaptation set. The client device may also avoid unnecessary updates of URLs, which tend to be updated frequently during, e.g., real-time network streaming of video data for live events. Even if redundancies in the MPD were eliminated, client device 40 would still need to parse the full MPD after receipt and reconstruction, which may waste a significant amount of computing time.

FIG. 5 is a conceptual diagram illustrating example adaptation sets. According to the example shown in FIG. 5, a first adaptation set 300 includes representations 304A, 304B, and 304C (collectively, representations 304), while a second adaptation set 308 includes representations 312A, 312B, and 312C (collectively, representations 312). The adaptation sets 300 and 308 may be similar to, or the same as, adaptation sets described with respect to FIGS. 4-5. The example adaptation sets 300 and 308 shown and described with respect to FIG. 5 may be compatible with any of the techniques described herein.

In the example shown in FIG. 5, each of the representations 304 of adaptation set 300 may have the same, or substantially the same bit rate. Within adaptation set 300, however, each of the representations 304 may have alternative numbers of switch points 316. As noted above, switch points 316 are typically encoded as I-frames, and may also be referred to as key frames. In other examples, however, representations 304 may have different bit rates (in addition to having alternative numbers of switch points 316).

According to some aspects of this disclosure, switch points 316 may be generally aligned within an adaptation set. For example, representation 304A includes a relatively large number of switch points as compared to representation 304B and 304C. That is, in some examples, representation 304B may include a subset of the switch points of 304A. Moreover, representation 304C may include a subset of the switch points of 304B. In other examples, the switch points of representations in an adaptation set need not necessarily be aligned.

In an example, the switch points 316 of representation 304A may occur approximately every two seconds. According to the example shown in FIG. 5, then, the switch points 316 of representation 304B may occur approximately every four seconds, with the switch points 316 of representation 304C may occur approximately every eight seconds. It should be understood that such durations between switch points are provided merely as examples for purposes of explanation, and alternative durations between switch points are possible.

In some examples, as noted above, the frequency of switch points may be related to a buffering duration (e.g., as identified in Table 3 above as minBufferTime). For example, representation 304A may have a shorter buffering duration than representation 304B, which may have a shorter buffering duration than representation 304C. Given a particular bit rate, however, the quality of representation 304C may be better than that of 304B, which may be better than that of 304C.

Adaptation set 308 may be configured similarly to adaptation set 300, but may include representations having a different bit rate than adaptation set 300. While the switch points 316 of the representations 312 shown in the example of FIG. 5 are not necessarily aligned, it should be understood, as noted above, that the switch points 316 may be aligned in some examples.

A server device, such as server device 60, may provide a plurality of adaptation sets having representations of different bit rates, such as adaptation sets 300 and 308 (e.g., as well as additional adaptation sets) shown in FIG. 5. A client device, such as client device 40 may select an adaptation set having an appropriate bit rate for bandwidth conditions, as well as a representation with a certain number of switch points (e.g., and corresponding minBufferTime).

For example, according to aspects of this disclosure, client device 40 may initially select a representation having a certain bit rate and a relatively short buffering duration (e.g., albeit relatively lower quality), buffer data of the representation, then switch to a representation of the same bit rate but having a relatively longer buffering duration (e.g., having a relatively higher quality).

Figure 6:
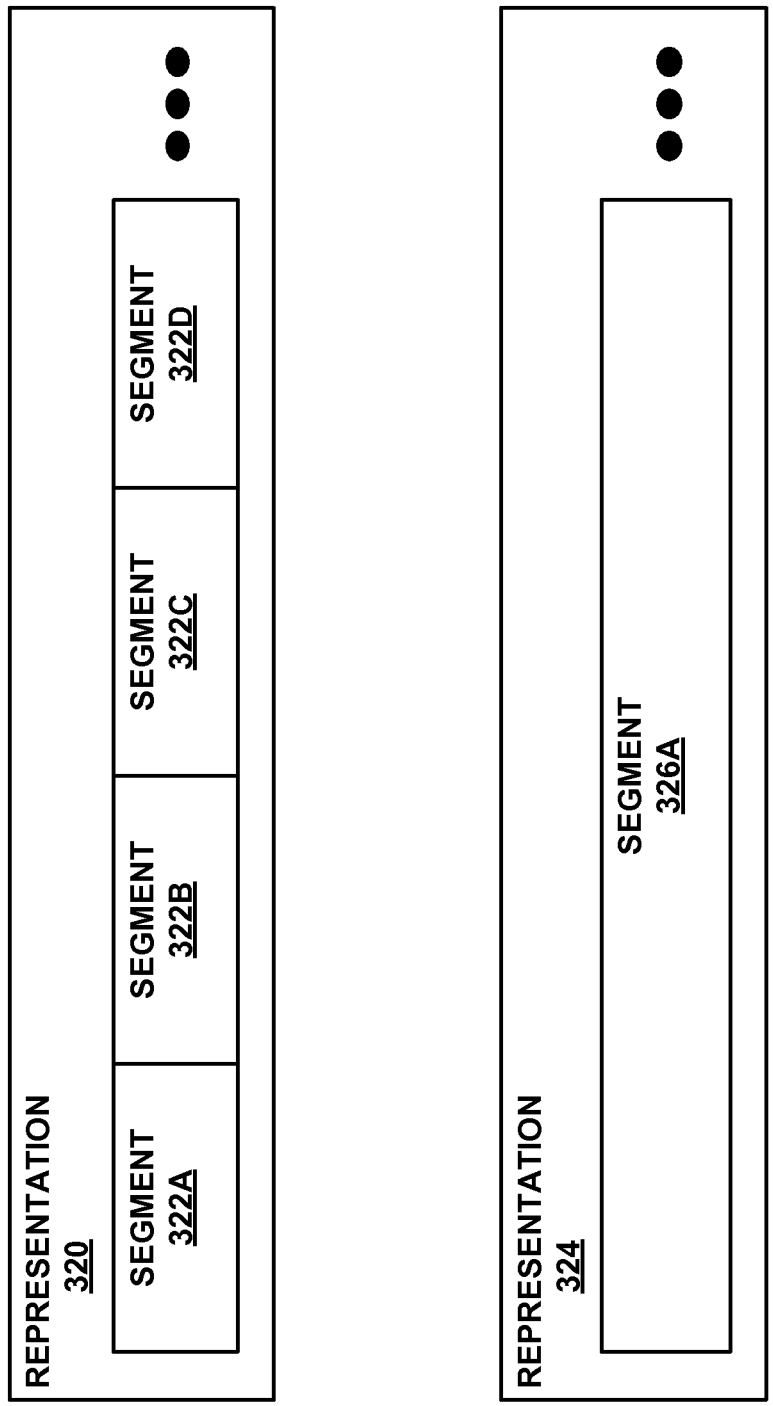
FIG. 6 is a conceptual diagram illustrating other example representations, according to aspects of this disclosure.

FIG. 6 is a conceptual diagram illustrating example representations. According to the example shown in FIG. 6, a first representation 320 includes a plurality of segments 322A-322D (collectively, segments 322), while a second representation 324 includes a plurality of segments 326 (e.g., beginning with segment 326A). In some examples, the representations shown in FIG. 6 may be configured similarly to representations 110 and 120 shown in FIG. 2. The example representations shown and described with respect to FIG. 6 may be compatible with any of the techniques described herein.

As noted above, the techniques of this disclosure generally relate to improving a user's experience when initially retrieving multimedia content and when performing bandwidth adaptation. Although certain techniques described above refer to representations having the same bit rate, these techniques may also be applied to representations having different bit rates.

For example, in the example shown in FIG. 6, representation 320 is an example of a representation that may be provided by a server via unicast, while representation 324 is an example of a representation that may be provided via broadcast. As shown in FIG. 6, representation 320 includes relatively smaller segments 322 than the segments 326 of representation 324. Moreover, representation 320 may be associated with a relatively shorter buffering duration than representation 324.

In some examples, a client device, such as client device 40 (FIG. 1), may be configured to initially select a representation based on the frequency of switch points, so long as the bit rate of the selected representation does not exceed the currently available bandwidth. Accordingly, in the example shown in FIG. 6, client device 40 may initially select representation 320. After buffering enough data of the initially selected representation 320, client device 40 may begin requesting data from a higher bit rate representation. In the example shown in FIG. 6, client device 40 may begin requesting data from representation 324, which may have less frequent switch points than the initially selected representation 320. Client device 40 may also switch back to representation 320 at sometime in the future, for example, if representation 324 is not available.

In a particular example, a server, such as server device 60 (FIG. 1), may broadcast representation 324 having relatively long periods of time between switch points (e.g., 10 seconds of playback time). Client device 40 may be configured to request a unicast of representation 320 having relatively more frequent switch points initially, then switch to the broadcast representation 324 after buffering sufficient data of the unicast representation 320. Similarly, if reception of the broadcast representation 324 is interrupted, the client device 40 may again begin retrieving the other representation 320 using unicast, and switch back to the broadcast representation 234 after buffering a sufficient amount of data of the unicast representation 320.

FIG. 7 is a conceptual diagram that graphically represents an example of a determined amount of network bandwidth, and a corresponding indication of a representation from which data is retrieved. The example of FIG. 7 assumes that there are at least four representations of a particular multimedia content: a 10 Mbps representation with switch points approximately every 3 seconds, a 10 Mbps representation with switch points approximately every 0.5 seconds, a 5 Mbps representation with switch points approximately every 2 seconds, and a 5 Mbps representation with switch points approximately every 0.5 seconds.

In the example of FIG. 7, a server device, such as server device 60, may provide indications of switch point frequencies (SP freq) for representations in a manifest file for the respective multimedia content. The manifest file may correspond to, for example, a media presentation description (MPD) file for the multimedia content. Client devices are generally configured to retrieve and analyze the manifest file to determine characteristics and attributes of representations of the multimedia content.

In accordance with the techniques of this disclosure, server device 60 may provide the indication of the frequencies of switch points for various representations in the manifest file for the representations. Providing data representative of characteristics of attributes of a representation is conventionally referred to as "signaling" the data. In other examples, server device 60 may signal the frequencies of switch points for the representations in the representations themselves. Alternatively, client devices, such as client devices 40, may be configured to infer the frequencies of switch points from data for segment index (SIDX) elements associated with segments of the representations.

In the example shown in FIG. 7, client device 40 may initially retrieve 10 Mbps representation with switch points approximately every 3 seconds. Upon the available network bandwidth being reduced, client device 40 may switch to a 5 Mbps representation with switch points approximately every 0.5 seconds. After buffering enough data to avoid underflow, according to aspects of this disclosure, client device 40 may retrieve a 5 Mbps representation with switch points approximately every 2 seconds. This 5 Mbps representation may have a relatively higher perceptual quality (despite being the same bit rate) due to the decreased number of switch points. Upon the available network bandwidth being increased, client device 40 may transition to a 10 Mbps representation with switch points approximately every 0.5 seconds. After buffering enough data of this representation to avoid underflow, client device 40 may again switch to a representation having fewer switch points and an increased perceptual quality (e.g., a 10 Mbps representation with switch points approximately every 3 seconds).

While the example of FIG. 7 illustrates switched-to representations having the same bit rates (e.g., a 5 Mbps representation with switch points approximately every 0.5 seconds and a 5 Mbps representation with switch points approximately every 2 seconds; a 10 Mbps representation with switch points approximately every 0.5 seconds and a 10 Mbps representation with switch points approximately every 3 seconds), as noted above, the techniques of this disclosure are not limited in this way. For example, according to other aspects, representations may alternate between alternate between representations having relatively frequent switch points and a higher bit rate and representations having less frequent switch points and a lower bit rate.

Accordingly, with respect to the example shown in FIG. 7, client device 40 may switch from the 5 Mbps representation having switch points approximately every 0.5 seconds to a representation having an even lower bit rate (e.g., 4 Mbps, 3 Mbps, or the like), but with the same or higher quality due to a reduced frequency of switch points. Additionally or alternatively, as noted above, client device 40 may consider an amount of data that has been buffered when selecting a representation to switch to. That is, if the amount of data that has been buffered is relatively low, client device 40 may select a representation having relatively frequent switch points. In contrast, if the amount of data that has been buffered is higher, client device may select a representation having less frequent switch points.

Figure 8:
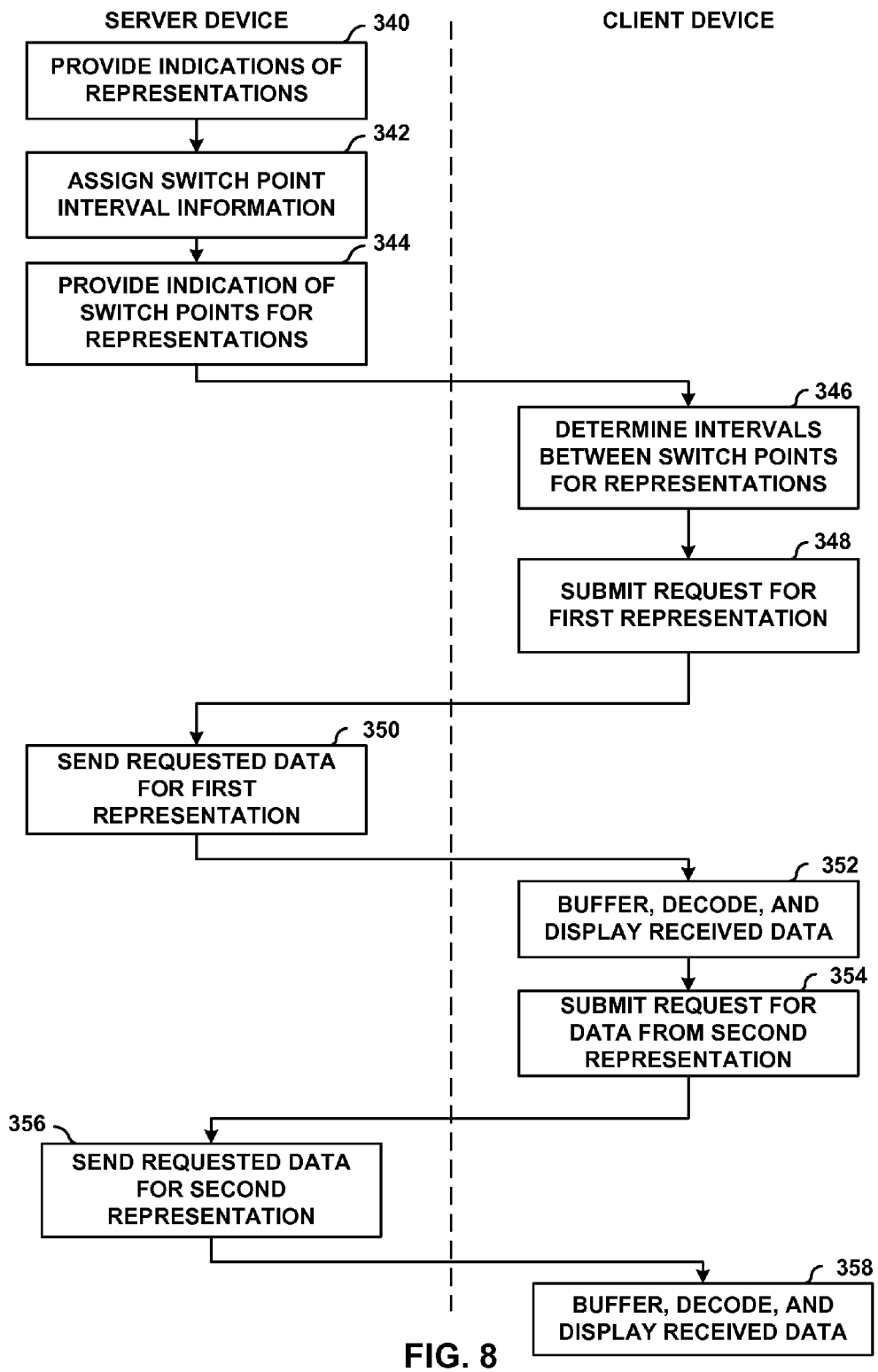
FIG. 8 is a flowchart illustrating an example method for performing aspects of this disclosure.

FIG. 8 is a flowchart illustrating an example method according to the techniques described in this disclosure. Although the method of FIG. 8 is described with respect to server device 60 and client device 40, it should be understood that other devices may implement techniques similar to those of the method of FIG. 8. For example, content preparation device 20, or one or more network devices of a content delivery network, may perform some or all of the functions attributed to server device 60.

Server device 60 may initially obtain (e.g., create, or receive from content preparation device 20) data for one or more representations of multimedia content, as well as a manifest file for the multimedia content. Server device 60 may also provide indications of representations of multimedia content, e.g., characteristics of the representations to client device 40 (340). In addition, server device 60 may determine switch point intervals for a number of representations having the same, or approximately the same bit rate (342). Server device 60 may provide, for each representation, an indication of the number of switch points included in the representation (344). Alternatively or additionally, server device 60 may provide, for each representation, an indication of the minBufferTime.

Client device 40 may determine the intervals between switch points for each received representation based on the received information (346). Client device 40 may also submit a request for a first representation (348). According to some aspects of this disclosure, client device 40 may initially select a representation having a relatively large number of switch points (e.g., and a correspondingly short buffering duration).

Upon receiving the request, server device 60 may provide the selected, first representation (350). Client device 40 may then begin buffering, decoding, and/or displaying the received data (352). According to aspects of this disclosure, upon receiving and/or buffering a certain amount of data from the first representation, client device 40 may submit a request for data from a second representation from server device 60. In some examples, the second representation may have relatively fewer (that is, less frequent) switch points than the first representation (e.g., and a correspondingly longer buffering duration). Moreover, the second representation may be of a higher quality than the first representation. That is, the second representation may have a bit rate that is substantially similar to the bit rate of the first representation, albeit with less frequent switch points (although in other examples the bit rates may be different, as described above). Accordingly, the second representation may achieve higher quality in that the second representation may be coded using relatively more P- and/or B-frames or slices, which may improve coding efficiency due to improved utilization of temporal redundancies within video data of the representation.

Upon receiving the request, server device 60 may provide the second representation (356). Client device 40 may then begin buffering, decoding and/or displaying the received data (358). Steps 354-358 may be performed repeatedly, based on network bandwidth conditions.

In this manner, the method of FIG. 8 represents an example of a method including determining a first interval between switch points for a first representation of the multimedia content and a second interval between switch points for a second representation of the multimedia content, wherein the first interval is less than the second interval. In addition, the method includes, based on the determination, submitting a network request that specifies an amount of video data from the first representation that has a playback time that is at least equal to a playback time between switch points in the second representation; and after submitting the request for the amount of video data from the first representation, retrieving video data from the second representation.

Likewise, the method of FIG. 8 represents an example of a method including forming a plurality of representations of the multimedia content. The method also includes assigning the representations switch point interval information representative of intervals between switch points for the respective representations, and sending video data of a first one of the representations to a client device in response to a request from the client device. The method also includes after sending an amount of video data from the first representation that has a playback time that is at least equal to a playback time between switch points in a second, different one of the representations, sending video data of the second one of the representations to the client device, wherein the interval between switch points for the second one of the representations is lower than the interval between switch points for the first one of the representations.

Figure 9:
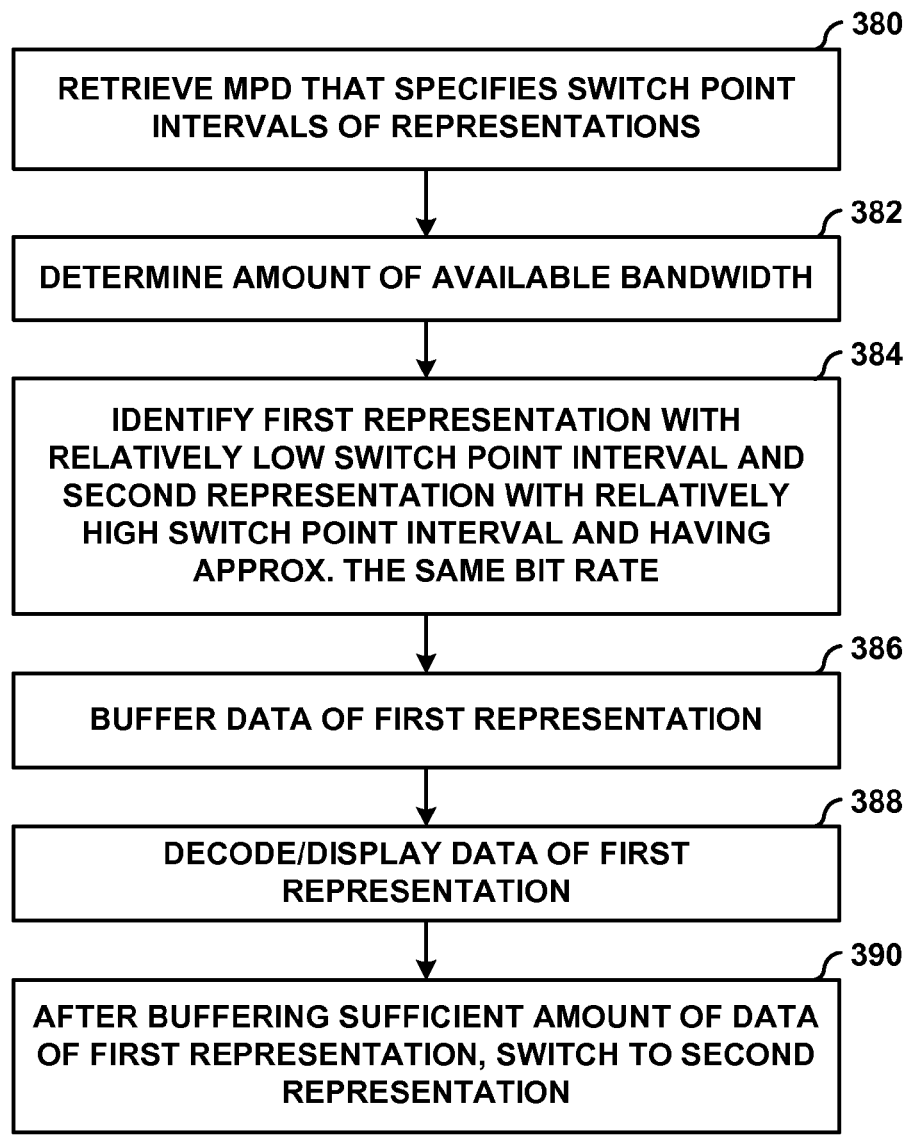
FIG. 9 is a flowchart illustrating an example method for performing aspects of this disclosure.

FIG. 9 is a flowchart illustrating an example method according to the techniques described in this disclosure. Although the method of FIG. 9 is described with respect to server device 60 and client device 40, it should be understood that other devices may implement techniques similar to those of the method of FIG. 9. For example, content preparation device 20, or one or more network devices of a content delivery network, may perform some or all of the functions attributed to server device 60.

The example of FIG. 9 generally illustrates techniques of this disclosure being performed by a client device, such as client device 40. For example, client device 40 may initially retrieve an MPD that specifies switch point intervals of a plurality of representations (e.g., such as representations of adaptation groups 300 and 308 shown in FIG. 5) (380). Client device 40 may then determine an available amount of bandwidth (382). That is, client device 40 may determine an amount of network bandwidth that is currently available for transmission of data from a server device, such as server device 60, to client device 40.

After determining the available bandwidth, client device 40 may identify a first representation with relatively low switch point interval and second representation with relatively high switch point interval. In some examples, the first and second representations may have approximately the same bit rate that can be satisfied by the available amount of bandwidth. For example, client device 40 may identify an adaptation group having the same, or approximately the same bit rate, but having representations that include different intervals of switch points (e.g., and, therefore, different qualities). In other examples, client device 40 may identify one or more adaptation groups that include representations having different bit rates. Client device 40 may then identify a first a first representation with relatively low switch point interval and second representation with relatively high switch point interval.

Client device 40 may then buffer data from first representation (386), and decode/display data of first representation (388). After buffering a sufficient amount of data of first representation (e.g., buffering an amount that has temporal data equal to or exceeding a temporal sequence between switch points of the second representation), client device 40 may switch to second representation (390). That is, client device 40 may buffer, decode, and display data of the second representation.

Figure 10:
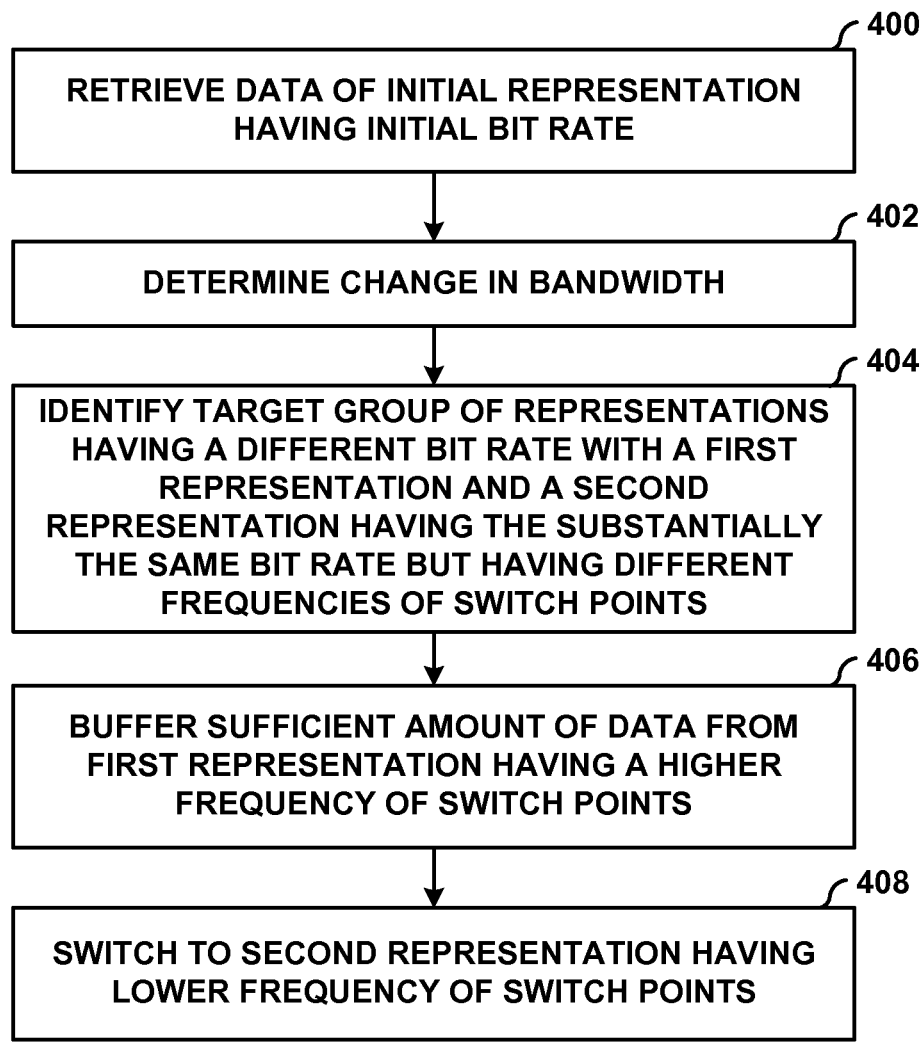
FIG. 10 is a flowchart illustrating an example method for performing aspects of this disclosure.

FIG. 10 is a flowchart illustrating an example method according to the techniques described in this disclosure. Although the method of FIG. 10 is described with respect to server device 60 and client device 40, it should be understood that other devices may implement techniques similar to those of the method of FIG. 10. For example, content preparation device 20, or one or more network devices of a content delivery network, may perform some or all of the functions attributed to server device 60.

As noted above, the techniques of this disclosure may be used in a variety of ways to improve retrieval of video data via network streaming. In some examples, two or more representations may have the same bit rate but different switch point frequencies (referred to in this example as a target group of representations).

In the example shown in FIG. 10, client device 40 may initially begin retrieving data of a certain representation at a certain bit rate (400). Client device 40 may then determine that network bandwidth availability has changed (402). In some examples, client device 40 may identify that the ability of the network to support the bit rate of the current representation has changed. For example, the amount of available network bandwidth may have decreased to a point that client device 40 determines that a representation with a lower bit rate that can be accommodated by the newly determined amount of available network bandwidth should be selected. Alternatively, the amount of available network bandwidth may have increased to a point that client device 40 determines that a representation with a higher bit rate should be selected, e.g., to improve playback quality.

Client device 40 may then identify a target group of representations, and in particular, a group of representations having the same or substantially the same bit rate, but having at least a first representation and a second representation, where the first representation includes a different frequency of switch points than the second representation (404). In a particular example the first representation may have a higher frequency of switch points than the second representation. Client device 40 may select the target group of representations based on the bit rate, where the bit rate can be satisfied by the newly determined amount of available network bandwidth. In other examples, client device 40 may select a target group of representations having slightly different bit rates that also have different frequencies of switch points.

Client device 40 may buffer a sufficient amount of data from a representation of the target group having a relatively high frequency of switch points (e.g., the first representation described above) (406). That is, for example, client device 40 may buffer enough data from the first representation to avoid buffer underflow, while also avoiding the necessity of executing two decoders simultaneously which may consume excess battery and processing power. After buffering a sufficient amount of data of this representation, client device 40 may switch to another one of the target group of representations (e.g., the second representation described above) having a lower frequency of switch points (408).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving video data of multimedia content, the method comprising:
   determining a first interval between switch points for a first representation of the multimedia content and a second interval between switch points for a second representation of the multimedia content, wherein the first interval is less than the second interval;
   based on the determination, submitting one or more network requests for an amount of video data from the first representation that has a playback time that is at least equal to a playback time between switch points in the second representation; and
   after submitting the request for the amount of video data from the first representation, retrieving video data from the second representation.

2. The method of claim 1, further comprising buffering video data from the first representation, and determining when to retrieve video data from the second representation based on a duration of the buffered video data.

3. The method of claim 2, wherein retrieving video data from the second representation based on the duration of the buffered video data comprises retrieving data from the second representation after buffering a duration of video data from the first representation that is approximately equal to the playback time between switch points in the second representation.

4. The method of claim 1, further comprising:
   determining a currently available amount of network bandwidth;
   receiving a manifest for the multimedia content that indicates that the first representation and the second representation have a common bit rate; and
   selecting the first representation and the second representation after determining that the common bit rate can be satisfied by the currently available amount of network bandwidth.

5. The method of claim 1, further comprising:
   determining a currently available amount of network bandwidth;
   receiving a manifest for the multimedia content that indicates that the first representation has a first bit rate and that the second representation has a second bit rate that is higher than the first bit rate; and determining whether the second bit rate can be satisfied by the currently available amount of network bandwidth, wherein requesting the video data from the first representation comprises requesting the video data from the first representation after determining that the second bit rate can be satisfied by the currently available amount of network bandwidth, and wherein retrieving the video data from the second representation after requesting the video data from the first representation comprises retrieving the video data from the second representation after determining that the second bit rate can be satisfied by the currently available amount of network bandwidth.

6. The method of claim 1, wherein requesting the video data from the first representation comprises:

sending one or more requests to a server device for the video data from the first representation; and receiving the video data from the first representation via a unicast, and wherein retrieving the video data from the second representation comprises retrieving the video data via at least one of a multicast or a broadcast from the server device.

7. The method of claim 1, further comprising receiving a manifest file for the multimedia content, wherein determining the first interval comprises determining the first interval from information in the manifest file, and wherein determining the second interval comprises determining the second interval from information in the manifest file.

8. The method of claim 1, wherein the first representation and the second representation have a common bit rate, the method further comprising:

prior to determining the first interval and the second interval, retrieving video data from a third, different representation having a different bit rate than the common bit rate;

determining a currently available amount of network bandwidth; and based on a determination that the common bit rate of the first representation and the second representation is more appropriate for the currently available amount of network bandwidth, determining the first interval and the second interval, submitting the one or more network requests for the video data from the first representation, and retrieving the video data from the second representation.

9. An apparatus for retrieving video data of multimedia content, apparatus comprising one or more processors configured to:

determine a first interval between switch points for a first representation of the multimedia content and a second interval between switch points for a second representation of the multimedia content, wherein the first interval is less than the second interval;

based on the determination, submit one or more network requests for an amount of video data from the first representation that has a playback time that is at least equal to a playback time between switch points in the second representation; and after submitting the request for the amount of video data from the first representation, retrieve video data from the second representation.

10. The apparatus of claim 9, wherein the one or more processors are further configured to buffer video data from the first representation, and determine when to retrieve video data from the second representation based on a duration of the buffered video data.

11. The apparatus of claim 10, wherein to retrieve video data from the second representation based on the duration of the buffered video data, the one or more processors are configured to retrieve data from the second representation after buffering a duration of video data from the first representation that is approximately equal to the playback time between switch points in the second representation.

12. The apparatus of claim 9, wherein the one or more processors are further configured to:

determine a currently available amount of network bandwidth;

receive a manifest for the multimedia content that indicates that the first representation and the second representation have a common bit rate; and select the first representation and the second representation after determining that the common bit rate can be satisfied by the currently available amount of network bandwidth.

13. The apparatus of claim 9, wherein the one or more processors are further configured to:

determine a currently available amount of network bandwidth;

receive a manifest for the multimedia content that indicates that the first representation has a first bit rate and that the second representation has a second bit rate that is higher than the first bit rate; and determine whether the second bit rate can be satisfied by the currently available amount of network bandwidth, wherein to request the video data from the first representation, the one or more processors are configured to request the video data from the first representation after determining that the second bit rate can be satisfied by the currently available amount of network bandwidth, and wherein to retrieve the video data from the second representation after requesting the video data from the first representation, the one or more processors are configured to retrieve the video data from the second representation after determining that the second bit rate can be satisfied by the currently available amount of network bandwidth.

14. The apparatus of claim 9, wherein to request the video data from the first representation the one or more processors are configured to:

send one or more requests to a server device for the video data from the first representation; and receive the video data from the first representation via a unicast, and wherein to retrieve the video data from the second representation, the one or more processors are configured to retrieve the video data via at least one of a multicast or a broadcast from the server device.

15. The apparatus of claim 9, wherein the one or more processors are configured to receive a manifest file for the multimedia content, wherein to determine the first interval, the one or more processors are configured to determine the first interval from information in the manifest file, and wherein to determine the second interval, the one or more processors are configured to determine the second interval from information in the manifest file.

16. The apparatus of claim 9, wherein the first representation and the second representation have a common bit rate, and wherein the one or more processors are further configured to:

prior to determining the first interval and the second interval, retrieve video data from a third, different representation having a different bit rate than the common bit rate;

determine a currently available amount of network bandwidth; and based on a determination that the common bit rate of the first representation and the second representation is more appropriate for the currently available amount of network bandwidth, determine the first interval and the second interval, submit the one or more network requests for the video data from the first representation, and retrieve the video data from the second representation.

17. An apparatus for retrieving video data of multimedia content, the apparatus comprising:

means for determining a first interval between switch points for a first representation of the multimedia content and a second interval between switch points for a second representation of the multimedia content, wherein the first interval is less than the second interval;

based on the determination, means for submitting one or more network requests for an amount of video data from the first representation that has a playback time that is at least equal to a playback time between switch points in the second representation; and after submitting the request for the amount of video data from the first representation, means for retrieving video data from the second representation.

18. The apparatus of claim 17, further comprising means for buffering video data from the first representation, and means for determining when to retrieve video data from the second representation based on a duration of the buffered video data.

19. The apparatus of claim 18, wherein means for retrieving video data from the second representation based on the duration of the buffered video data comprises means for retrieving data from the second representation after buffering a duration of video data from the first representation that is approximately equal to the playback time between switch points in the second representation.

20. The apparatus of claim 17, further comprising:

means for determining a currently available amount of network bandwidth;

means for receiving a manifest for the multimedia content that indicates that the first representation and the second representation have a common bit rate; and means for selecting the first representation and the second representation after determining that the common bit rate can be satisfied by the currently available amount of network bandwidth.

21. The apparatus of claim 17, further comprising:

means for determining a currently available amount of network bandwidth;

means for receiving a manifest for the multimedia content that indicates that the first representation has a first bit rate and that the second representation has a second bit rate that is higher than the first bit rate; and means for determining whether the second bit rate can be satisfied by the currently available amount of network bandwidth, wherein means for requesting the video data from the first representation comprises means for requesting the video data from the first representation after determining that the second bit rate can be satisfied by the currently available amount of network bandwidth, and wherein means for retrieving the video data from the second representation after requesting the video data from the first representation comprises means for retrieving the video data from the second representation after determining that the second bit rate can be satisfied by the currently available amount of network bandwidth.

22. The apparatus of claim 17, wherein means for requesting the video data from the first representation comprises:

means for sending one or more requests to a server device for the video data from the first representation; and means for receiving the video data from the first representation via a unicast, and wherein means for retrieving the video data from the second representation comprises means for retrieving the video data via at least one of a multicast or a broadcast from the server device.

23. The apparatus of claim 17, further comprising means for receiving a manifest file for the multimedia content, wherein means for determining the first interval comprises means for determining the first interval from information in the manifest file, and wherein means for determining the second interval comprises means for determining the second interval from information in the manifest file.

24. The apparatus of claim 17, wherein the first representation and the second representation have a common bit rate, the apparatus further comprising:

prior to determining the first interval and the second interval, means for retrieving video data from a third, different representation having a different bit rate than the common bit rate;

means for determining a currently available amount of network bandwidth; and based on a determination that the common bit rate of the first representation and the second representation is more appropriate for the currently available amount of network bandwidth, means for determining the first interval and the second interval, means for submitting the one or more network requests for the video data from the first representation, and retrieving the video data from the second representation.

25. A non-transitory computer-readable storage medium storing instructions that, when executed, cause one or more processors to:

determine a first interval between switch points for a first representation of the multimedia content and a second interval between switch points for a second representation of the multimedia content, wherein the first interval is less than the second interval;

based on the determination, submit one or more network requests for an amount of video data from the first representation that has a playback time that is at least equal to a playback time between switch points in the second representation; and after submitting the request for the amount of video data from the first representation, retrieve video data from the second representation.

26. The computer-readable storage medium of claim 25, wherein the instructions cause the one or more processors to buffer video data from the first representation, and determine when to retrieve video data from the second representation based on a duration of the buffered video data.

27. The computer-readable storage medium of claim 26, wherein to retrieve video data from the second representation based on the duration of the buffered video data, the instructions cause the one or more processors to retrieve data from the second representation after buffering a duration of video data from the first representation that is approximately equal to the playback time between switch points in the second representation.

28. The computer-readable storage medium of claim 25, wherein the instructions cause the one or more processors to:
determine a currently available amount of network bandwidth;
receive a manifest for the multimedia content that indicates that the first representation and the second representation have a common bit rate; and
select the first representation and the second representation after determining that the common bit rate can be satisfied by the currently available amount of network bandwidth.

29. The computer-readable storage medium of claim 25, wherein the one or more processors are further configured to:
determine a currently available amount of network bandwidth;
receive a manifest for the multimedia content that indicates that the first representation has a first bit rate and that the second representation has a second bit rate that is higher than the first bit rate; and
determine whether the second bit rate can be satisfied by the currently available amount of network bandwidth,
wherein to request the video data from the first representation, the instructions cause the one or more processors to request the video data from the first representation after determining that the second bit rate can be satisfied by the currently available amount of network bandwidth, and
wherein to retrieve the video data from the second representation after requesting the video data from the first representation, the instructions cause the one or more processors to retrieve the video data from the second representation after determining that the second bit rate can be satisfied by the currently available amount of network bandwidth.

30. The computer-readable storage medium of claim 25, wherein to request the video data from the first representation, the instructions cause the one or more processors to:
send one or more requests to a server device for the video data from the first representation; and
receive the video data from the first representation via a unicast, and
wherein to retrieve the video data from the second representation, the instructions cause the one or more processors to retrieve the video data via at least one of a multicast or a broadcast from the server device.

31. The computer-readable storage medium of claim 25, wherein the instructions cause the one or more processors to receive a manifest file for the multimedia content, wherein to determine the first interval, the instructions cause the one or more processors to determine the first interval from information in the manifest file, and wherein to determine the second interval, the instructions cause the one or more processors to determine the second interval from information in the manifest file.

32. The computer-readable storage medium of claim 25, wherein the first representation and the second representation have a common bit rate, and wherein the instructions further cause the one or more processors to:
prior to determining the first interval and the second interval, retrieve video data from a third, different representation having a different bit rate than the common bit rate;
determine a currently available amount of network bandwidth; and
based on a determination that the common bit rate of the first representation and the second representation is more appropriate for the currently available amount of network bandwidth, determine the first interval and the second interval, submit the one or more network requests for the video data from the first representation, and retrieve the video data from the second representation.

33. A method of streaming video data of multimedia content, the method comprising:
receiving a plurality of representations of the multimedia content, wherein the representations include switch point interval information representative of intervals between switch points for the respective representations;
sending video data of a first one of the representations to a client device in response to a request from the client device; and
after sending an amount of video data from the first representation that has a playback time that is at least equal to a playback time between switch points in a second, different one of the representations, sending video data of the second one of the representations to the client device, wherein the interval between switch points for the second one of the representations is lower than the interval between switch points for the first one of the representations.

34. The method of claim 33, wherein forming the plurality of representations comprises:
forming the first one of the representations to include switch points at the interval between switch points for the first one of the representations; and
forming the second one of the representations to include switch points at the interval between switch points for the second one of the representations, such that each of the switch points of the second representation occurs at a temporal location corresponding to a temporal location of one of the switch points of the first representation.

35. The method of claim 34, wherein the switch points of the second one of the representations comprise a sub-set of the switch points of the first one of the representations.

36. The method of claim 33,
wherein sending the video data of the first one of the representations comprises sending the video data of the first one of the representations via unicast, and
wherein sending the video data of the second one of the representations comprises sending the video data of the second one of the representations via broadcast.

37. The method of claim 33, wherein assigning the representations switch point interval information comprises providing the switch point interval information in a manifest file for the multimedia content.

38. An apparatus for streaming video data of multimedia content, the apparatus comprising one or more processors configured to:
receive a plurality of representations of the multimedia content, wherein the representations include switch point interval information representative of intervals between switch points for the respective representations;
send video data of a first one of the representations to a client device in response to a request from the client device; and
after sending an amount of video data from the first representation that has a playback time that is at least equal to a playback time between switch points in a second, different one of the representations, send video data of the second one of the representations to the client device, wherein the interval between switch points for the second one of the representations is lower than the interval between switch points for the first one of the representations.

39. The apparatus of claim 38, wherein to form the plurality of representations, the one or more processors are configured to:
form the first one of the representations to include switch points at the interval between switch points for the first one of the representations; and
form the second one of the representations to include switch points at the interval between switch points for the second one of the representations, such that each of the switch points of the second representation occurs at a temporal location corresponding to a temporal location of one of the switch points of the first representation.

40. The apparatus of claim 39, wherein the switch points of the second one of the representations comprise a sub-set of the switch points of the first one of the representations.

41. The apparatus of claim 38, wherein to send the video data of the first one of the representations, the one or more processors are configured to send the video data of the first one of the representations via unicast, and
wherein to send the video data of the second one of the representations, the one or more processors are configured to send the video data of the second one of the representations via broadcast.

42. The apparatus of claim 38, wherein to assign the representations switch point interval information, the one or more processors are configured to provide the switch point interval information in a manifest file for the multimedia content.

43. An apparatus for streaming video data of multimedia content, the apparatus comprising:
means for receiving a plurality of representations of the multimedia content, wherein the representations include switch point interval information representative of intervals between switch points for the respective representations;
means for sending video data of a first one of the representations to a client device in response to a request from the client device; and
after sending an amount of video data from the first representation that has a playback time that is at least equal to a playback time between switch points in a second, different one of the representations, means for sending video data of the second one of the representations to the client device, wherein the interval between switch points for the second one of the representations is lower than the interval between switch points for the first one of the representations.

44. The apparatus of claim 43, wherein means for forming the plurality of representations comprises:
means for forming the first one of the representations to include switch points at the interval between switch points for the first one of the representations; and
means for forming the second one of the representations to include switch points at the interval between switch points for the second one of the representations, such that each of the switch points of the second representation occurs at a temporal location corresponding to a temporal location of one of the switch points of the first representation.

45. The apparatus of claim 44, wherein the switch points of the second one of the representations comprise a sub-set of the switch points of the first one of the representations.

46. The apparatus of claim 43,
wherein means for sending the video data of the first one of the representations comprises means for sending the video data of the first one of the representations via unicast, and
wherein means for sending the video data of the second one of the representations comprises means for sending the video data of the second one of the representations via broadcast.

47. The apparatus of claim 43, wherein means for assigning the representations switch point interval information comprises means for providing the switch point interval information in a manifest file for the multimedia content.

48. A non-transitory computer-readable storage medium storing instructions that, when executed, cause one or more processors to:
receive a plurality of representations of the multimedia content, wherein the representations include switch point interval information representative of intervals between switch points for the respective representations;
send video data of a first one of the representations to a client device in response to a request from the client device; and
after sending an amount of video data from the first representation that has a playback time that is at least equal to a playback time between switch points in a second, different one of the representations, send video data of the second one of the representations to the client device, wherein the interval between switch points for the second one of the representations is lower than the interval between switch points for the first one of the representations.

49. The computer-readable storage medium of claim 48, wherein to form the plurality of representations, the instructions cause the one or more processors:
form the first one of the representations to include switch points at the interval between switch points for the first one of the representations; and
form the second one of the representations to include switch points at the interval between switch points for the second one of the representations, such that each of the switch points of the second representation occurs at a temporal location corresponding to a temporal location of one of the switch points of the first representation.

50. The computer-readable storage medium of claim 49, wherein the switch points of the second one of the representations comprise a sub-set of the switch points of the first one of the representations.

51. The computer-readable storage medium of claim 48,
wherein to send the video data of the first one of the representations, the instructions cause the one or more processors to send the video data of the first one of the representations via unicast, and
wherein to send the video data of the second one of the representations, the instructions cause the one or more processors to send the video data of the second one of the representations via broadcast.

52. The computer-readable storage medium of claim 48, wherein to assign the representations switch point interval information, the instructions cause the one or more processors to provide the switch point interval information in a manifest file for the multimedia content.

* * * * *